United States Patent [19]
Clare et al.

[11] Patent Number: 6,030,018
[45] Date of Patent: Feb. 29, 2000

[54] TRUCK BED HAVING HINGED SIDE PANEL SECTIONS

[76] Inventors: Scott Clare, 3381 Shan Ct.; Neil G. Long, 2630 Randal Way, both of Hayward, Calif. 94541

[21] Appl. No.: 09/268,586

[22] Filed: Mar. 15, 1999

Related U.S. Application Data

[63] Continuation-in-part of application No. 08/896,392, Jul. 18, 1997, which is a continuation-in-part of application No. 08/685,678, Jul. 24, 1996, abandoned, which is a continuation-in-part of application No. 08/506,893, Jul. 26, 1995, Pat. No. 5,567,000.

[51] Int. Cl.$^7$ .................................................. B62D 33/00
[52] U.S. Cl. .......................................... 296/37.6; 224/404
[58] Field of Search .................................. 296/24.1, 37.1, 296/37.6, 181, 183; 224/402, 403, 404

[56] References Cited

U.S. PATENT DOCUMENTS

| | | | |
|---|---|---|---|
| 1,990,757 | 2/1935 | Stiles | 296/37.1 X |
| 2,616,754 | 11/1952 | Stahl | 296/37.6 X |
| 2,941,837 | 6/1960 | McCready | 296/37.1 X |
| 3,245,713 | 4/1966 | Ogilvie | 296/37.6 X |
| 3,727,971 | 4/1973 | Sisler | 296/37.6 |
| 4,126,349 | 11/1978 | Nelson et al. | 296/37.6 X |
| 4,135,761 | 1/1979 | Ward | 296/37.6 |
| 4,685,695 | 8/1987 | LeVee | 296/37.6 X |

*Primary Examiner*—Gary C. Hoge
*Attorney, Agent, or Firm*—L. E. Carnahan

[57] ABSTRACT

A vehicle bed having hinged side panel sections which provides side access to the interior of the bed or to a storage system mounted adjacent the hinged side panel sections. The side panel sections may include inner and outer panels. The bed additionally is provided with hinged trim panels located below the hinged side panel sections. The vehicle bed may be provided with support structures of a yoke type or a collapsible beam type. The hinged side panel sections may be hinged by piano type or spring-loaded type hinges to open upwardly, downwardly or sideways, and may include a collapsible mechanism for moving a side panel section outwardly and upwardly. The hinged side panel sections may include both the inner and outer panels or the outer panel alone with the inner panel being removed. The hinged side panel sections are retained in a closed position by either an electrical or mechanical actuated lock/latch mechanism, which is preferably hidden from view, but which may include an exposed key slot or surface flush handle. The storage system includes a box having an opening adjacent the hinged side panel section and the box may include one or more drain/air relief valve assemblies, and be provided with compartments, shelves of a slideable, adjustable or pivotable type, and may include a collapsible support mechanism for a tray, compartment, shelf, etc. The hinged side panel sections may be retained open by one or more strut assemblies or spring-loaded hinges.

16 Claims, 13 Drawing Sheets

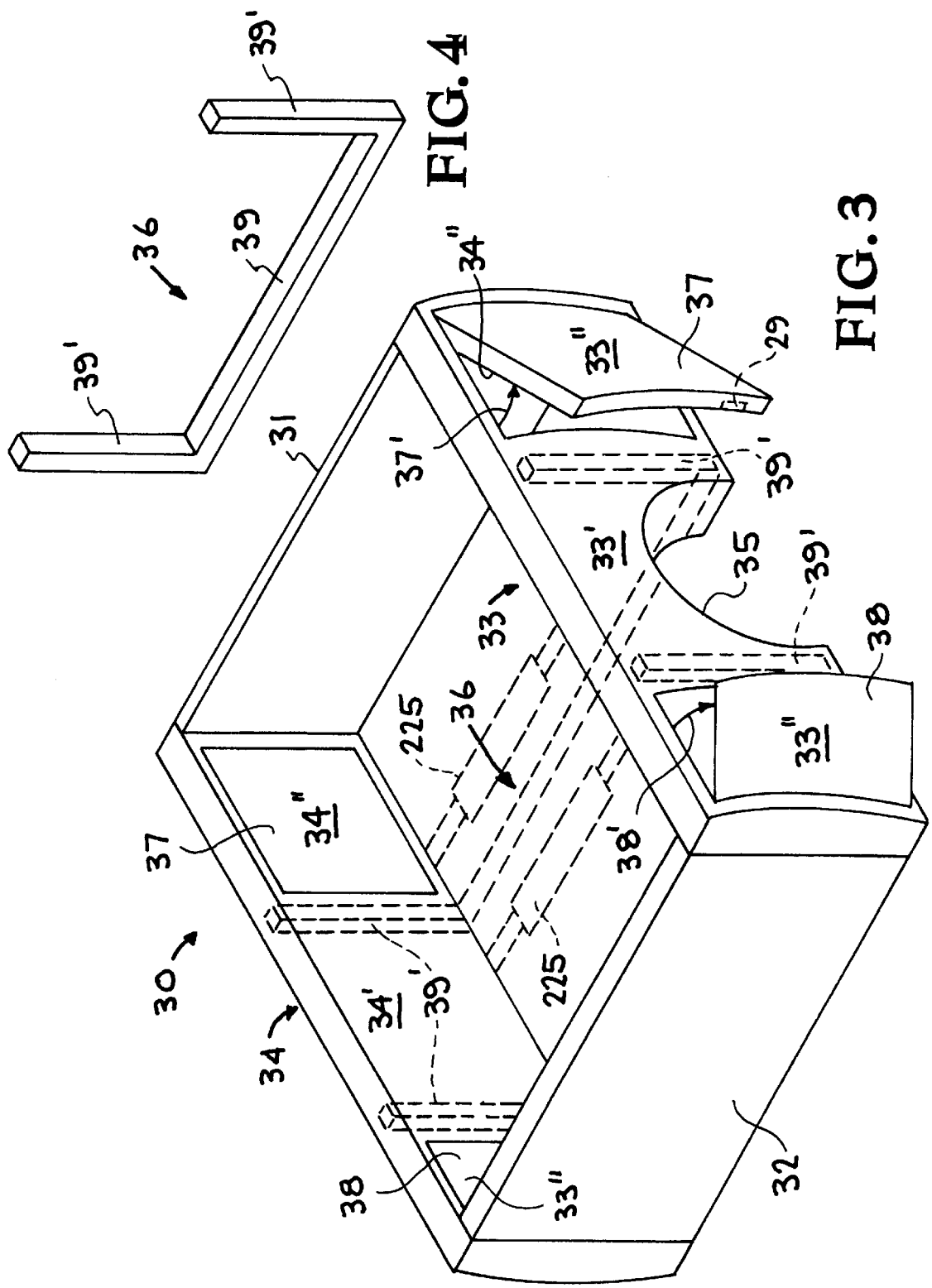

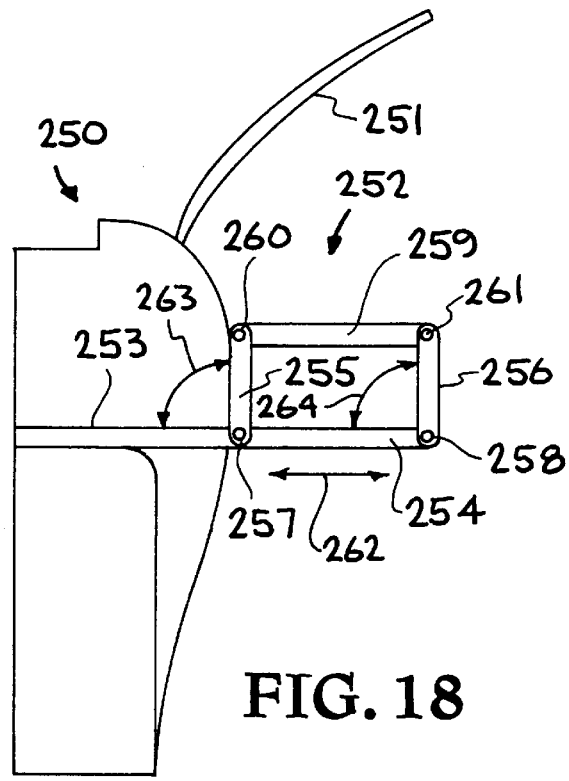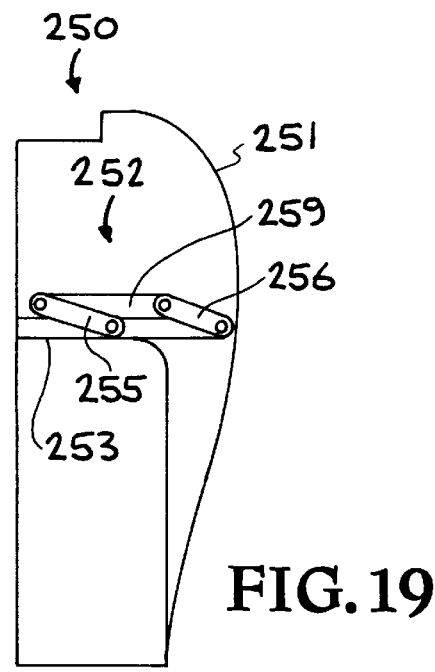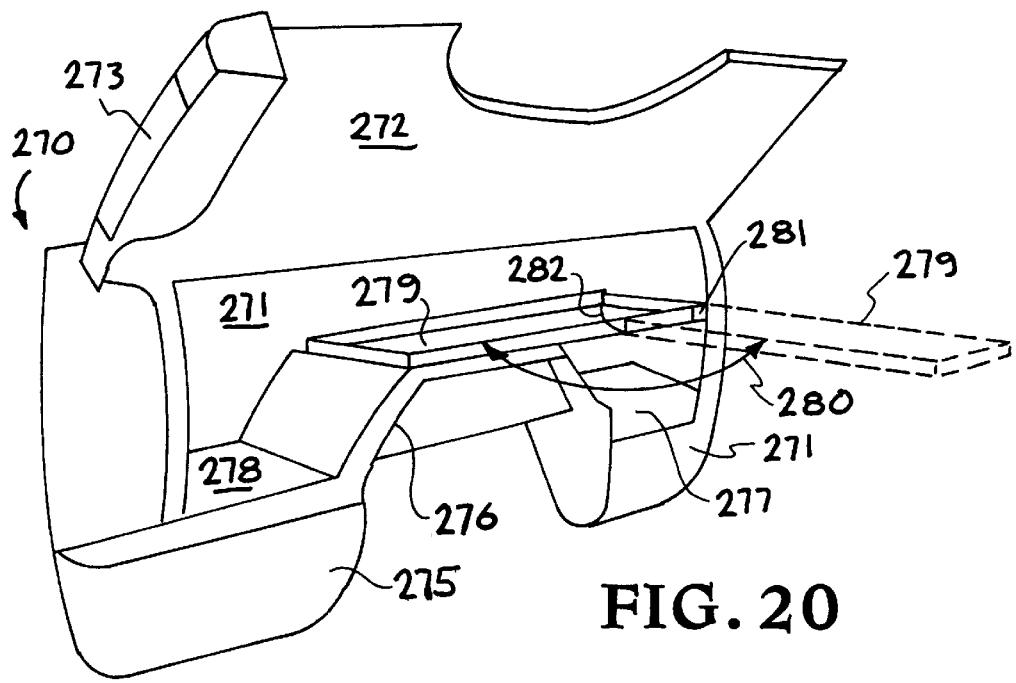
FIG. 18
FIG. 19
FIG. 20

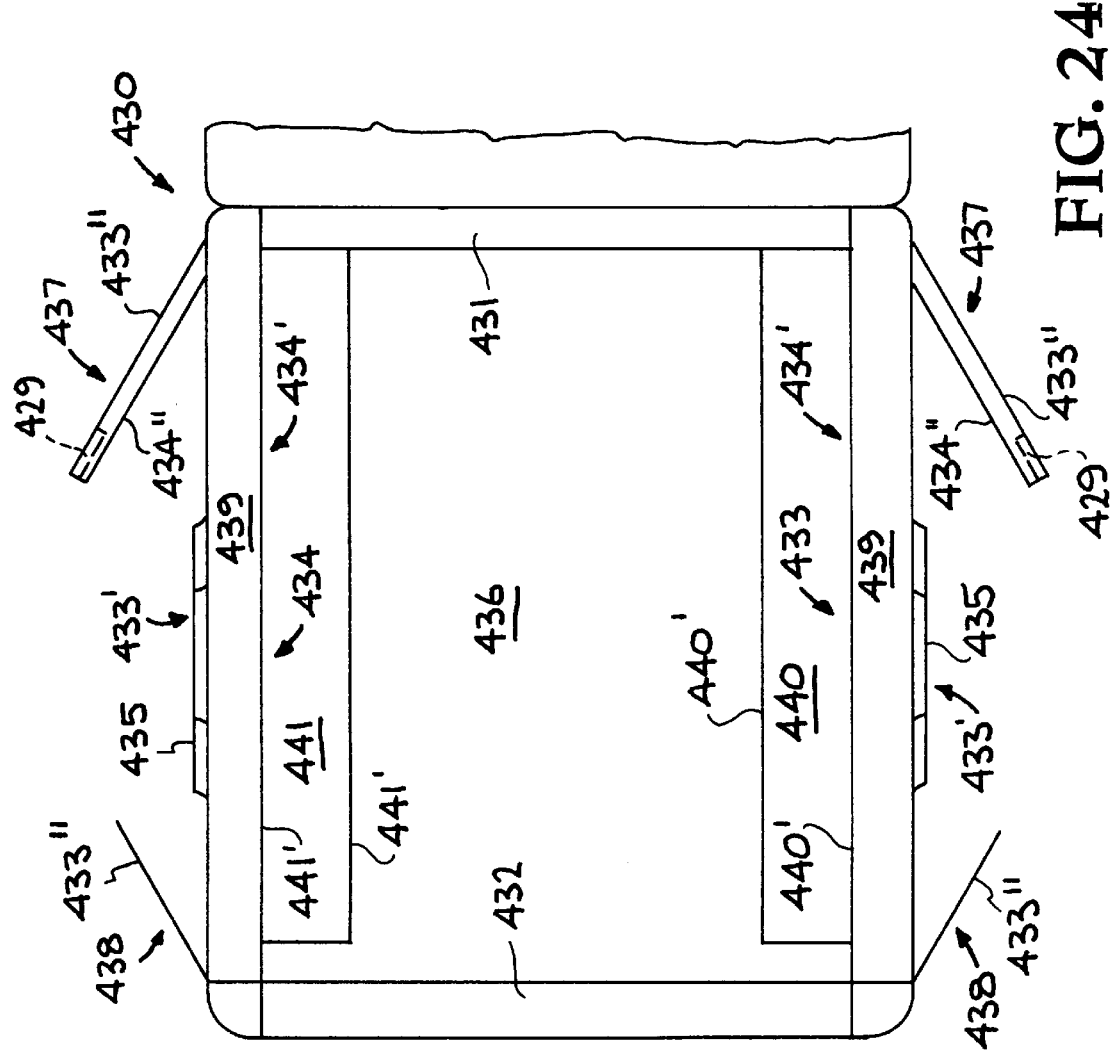

TRUCK BED HAVING HINGED SIDE PANEL SECTIONS

RELATED APPLICATION

This application is a Continuation-In-Part of U.S. application Ser. No. 08/896,392 filed Jul. 18, 1997, which is a Continuation-In-Part of U.S. application Ser. No. 08/685,678 filed Jul. 24, 1996, now abandoned, which is a Continuation-In-Part of U.S. application Ser. No. 08/506,893 filed Jul. 26, 1995, now U.S. Pat. No. 5,567,000 issued Oct. 22, 1996.

BACKGROUND OF THE INVENTION

The present invention relates to storage systems for vehicles, particularly to hidden storage for vehicles having side panels, while maintaining the external appearance thereof, and more particularly to different hidden storage arrangements, including various hinged side panel and shelving configurations, without substantially altering the external appearance of the vehicle.

Various types of storage/utility systems have been utilized in various types of vehicles, primarily pickups, trucks and trailers for transporting and/or storing tools, materials, etc. These prior utility beds for pickup trucks are exemplified by U.S. Pat. No. 2,978,153, U.S. Pat. No. 3,245,713, U.S. Pat. No. 3,727,971, U.S. Pat. No. 4,685,695 and U.S. Pat. No. 5,615,922, all of which have hinged sections exposed to view. Also, U.S. Pat. No. 1,990,757 teaches hinging a rear quarter panel to provide access to a compartment but does not teach how the panel is hinged. In addition, recently issued Design Pat. No. 385,224 teaches a utility bed for a pickup wherein the side panels have been widened to cover the wheel wells to provide storage space and includes a compartment above the wheel well and compartments forward and aft of the wheel well, with each compartment having an exposed latch mechanism. Recently a hidden storage system has been developed wherein the external appearance or contour of the vehicle has not been changed when compared to the same vehicle without a storage system therein, and the carrying capacity has not been significantly reduced. This hidden storage system for pickup and truck beds and trailers is described and claimed in above-referenced U.S. Pat. No. 5,567,000. Also, U.S. Pat. No. 5,823,598, issued Oct. 20, 1998, describes and claims hidden storage systems for vans, utility and sports utility vehicles as well as modifications of the hidden storage arrangement of U.S. Pat. No. 5,567,000. Fabrication of the hidden storage system may be carried out, for example, as described and claimed in U.S. Pat. No. 5,784,769 and U.S. Pat. No. 5,819,390.

The hidden storage system of U.S. Pat. No. 5,567,000, for example, basically involved providing storage adjacent the wheel well area along part or the entire length of the bed, and providing, for 20 example, the fender/side panel of the bed with a hinge and lock/latch arrangement whereby the fender/side panel can be opened to expose the storage area or closed and latched to conceal the storage area. In the closed position, the external appearance is substantially the same as an identical vehicle without the hidden storage capability. Thus, by use of the hidden storage system, the vehicle can be parked in areas where theft would likely occur from conventional storage systems.

Like pickups, trucks and trailers, there is small to no hidden storage in emergency vehicles, vans, utility vehicles and sports utility vehicles. Any hidden storage in such vehicles is in the interior thereof and access to the interior provides access to the hidden storage areas. Thus, theft from such vehicles is carried out by merely obtaining access to the interior thereof. To prevent potential theft, valuables must be removed from the vehicle and/or expensive alarm systems must be added. Thus, there has been a need for safe, readily accessible hidden storage in emergency vehicles, vans and utility/sports vehicles.

This need for hidden storage for such vehicles has been resolved by the hidden storage system of above referenced Pat. No. 5,823,598 and copending application Ser. No. 09/082,281 filed May 20, 1998 by applying the principles of that hidden storage system to emergency vehicles, vans, utility vehicles and sports utility vehicles, wherein side panel sections of the vehicle are hinged and provided with storage areas which are accessible upon outward movement (upward, downward or sideways) of the hinged side panel sections. In addition to the interior of the emergency vehicle, van utility and/or sports utility vehicles, which provide storage but the storage is readily accessible to theft, the hidden storage provides a "trunk" for such vehicles with minimum altering of the external appearance of the side panels of the vehicle, and which is readily accessible to the owner but not readily accessible to theft.

The hidden storage system of the present invention expands that of U.S. Pat. No. 5,567,000 and U.S. Pat. No. 5,823,598 by providing different approaches to hinging the side panels and various configurations of the storage interior and shelving arrangements. The hidden storage system of this invention can be fabricated via a conversion method, a modular assembly method, or an assembly line method.

SUMMARY OF THE INVENTION

It is the object of the invention to provide hidden storage for vehicles without noticeable alteration of the external appearance of the vehicles.

A further object of the invention is to provide various hinged side panels or fender/side panel section arrangements and various storage box shelving configurations.

A further object of the invention is to provide hidden storage for vehicles utilizing hinged and latched sections of the side panels or fender/side panels of the vehicles.

Another object of the invention is to provide a vehicle with safe, readily accessible hidden storage that is not accessible by mere access to the interior of the vehicle.

Another object of the invention is to provide a vehicle with a hidden storage area along at least one side of the vehicle, that is accessible only by outward movement of at least one hinged section of a side panel or fender/side panel of the vehicle, without altering the normal external appearance of the vehicle.

Another object of the invention is to provide hidden storage or a vehicle bed which may, for example, extend along the entire length or along a partial length of the vehicle bed, and which is accessible only via one or more hinged and latched sections of the side panel or fender/side panel of the vehicle, with no or only minor modification of the external appearance of the vehicle.

Other objects and advantages of the present invention will become apparent from the following description and accompanying drawings. Basically, the invention involves providing hidden storage for vehicles, particularly for pickup truck beds or for trucks, vans, emergency, utility and sports utility vehicles having side panels, with only minor or no alteration of the normal external appearance of the vehicle bed. The minor alteration of the normal external appearance involves only thin vertical and/or horizontal lines in the side panels or fender/side panels which define the edge or edges of the hinged side panel sections, the hinges for the side panel sections being hidden with a latch/lock arrangement being hidden and accessible from the interior of the bed or within a vehicle cab, for example, or by electrical control for a key or keyless control in the vehicle whereby the lock of the latch/lock arrangement may be located anywhere on or in the vehicle. Due to the width of a normal vehicle side panel or fender/side panel, which consists of an outer and an inner panel, removal of the inner panel, hinging of the outer panel, and positioning of a narrow storage box having its only opening adjacent the removed inner panel provides adequate storage space for long items such as snow or water skis, ski poles, surfboards, rifles, etc., as well as for storage of emergency type supplies, etc., as well as for camping/sports equipment or for materials or tools utilized in various trades. The narrow storage box, which may be as wide as the wheel wells of the vehicle, or narrower, results in only a small loss of interior space along the interior of one or both sides of the vehicle. By way of example, using a conventional van having only a driver door on the left side of the van, the hidden storage could extend from adjacent the driver's door to the rear of the van, the storage box being configured, for example, to conform to the floor and any wheel well area of the van, or can be located above the wheel well, if desired. With the storage box welded or otherwise secured to the side of the van, the only access to the interior of the storage box is via one or more hinged portions of the outer panel section of the side panel or fender/side panel, depending on the external configuration of the vehicle. By use of hidden hinges and hidden latch mechanisms which are commercially available and capable of withstanding up to 1,500 pounds pry pressure and controlled by conventionally available lock systems, the only changes in the exterior appearance of the side panel of the vehicle are the narrow lines along the vertical and/or horizontal edges of the hinged side panel section or sections. The hinged side panel sections are provided on the interior surfaces with sufficient support members and with insulation/sound absorbing materials. The opening or openings in the side panels are provided with seals similar to car trunk lid seals, such that when the hinged side panel sections are closed, water/dust cannot enter the hidden storage area. Recently, anti-frost seals have been developed for vehicles operating in extremely cold climates, as exemplified by copending U.S. application Ser. No. 09/082,436 filed May 20, 1998 entitled "Vehicle Compartment Seals".

The hidden storage arrangement provided by this invention, while specifically directed to pickup truck beds, also enables numerous types of vehicles to be built or modified to include one or more hidden storage compartments which are accessible only via one or more hinged side panel sections of the vehicle, and with the hinged side panel(s) closed, the storage compartments are not easily identified because of no modification or only minor modification in the exterior surface of the vehicle and having no exposed lock/latch mechanisms, but if desired may include an exposed key slot. The hidden storage can be incorporated into a vehicle by conventional assembly line techniques, modular fabrication and assembly, or conversion or retrofitting an existing vehicle. The present invention expands the hidden storage concept by providing various hinged panel or panel section arrangements and providing various arrangements for shelving, compartments, etc. within the storage box. The shelving arrangements include sliding, pivoting and hinged shelves.

BRIEF DESCRIPTION OF THE DRAWINGS

The accompanying drawings, which are incorporated into and form a part of the disclosure, illustrate embodiments of the invention and, together with the description, serve to explain the principles of the invention.

FIGS. 3 and 4 are views of a vehicle bed with hinged panel sections on each side for allowing side access to the bed, and a structural yoke assembly for the vehicle bed.

FIGS. 18 and 19 illustrate an embodiment of a hidden storage system utilizing a collapsible shelf support arrangement.

FIG. 20 is a side view of a pickup bed hidden storage system incorporating sliding or a pivotable shelf or tray.

FIG. 24 is a top view of a pickup bed similar to that of FIG. 3 showing the storage boxes mounted adjacent the side panels.

DETAILED DESCRIPTION OF THE INVENTION

Figure 10:
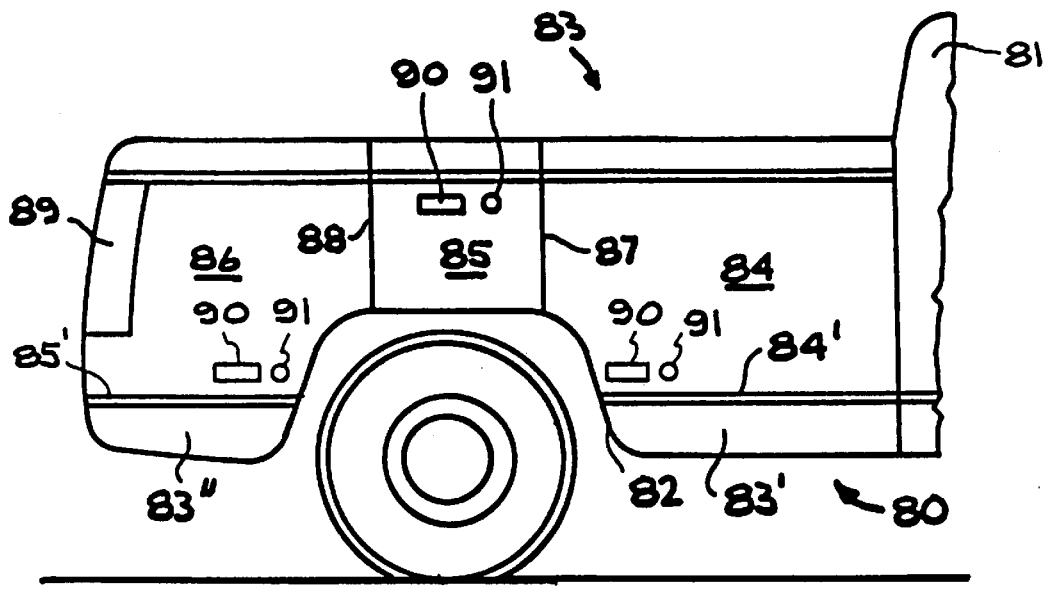
FIG. 10 is a side view of a pickup bed having three hinged side panel sections, with one section including the taillight assembly.

The present invention is directed to hidden storage for vehicles such as pickups, trucks, vans and emergency/utility/sports utility vehicles, without substantially altering the external appearance of the vehicle, and is particularly concerned with hinged side panel section arrangements and with shelving arrangements for the storage system. The hidden storage for vehicles as provided by the present invention basically involves providing the vehicle with one or more storage boxes with openings located adjacent one or both side panels or fender/side panels of the vehicle, hinging at least one section of the one or both side panels or fender/side panels, whereby the hinged section can be opened to expose the interior of the storage box, and providing latch/lock mechanisms for the hinged side panel sections. The only alterations of the external appearance of the vehicle, with the exception of FIG. 10, are the narrow vertical and/or horizontal cuts defining the edges of the hinged side panel section or sections, the hinges and latch mechanisms being hidden from an external view of the vehicle except for an optional key slot.

Pickups, trucks, vans, both passenger and commercial, as well as emergency vehicles, utility vehicles and sports utility vehicles, are widely utilized in various fields of work, play and vacations. Pickups, utility vehicles, sports utility vehicles, and some emergency vehicles are all classified as trucks in that they utilize a truck frame and undercarriage, either single or double rear wheels, and may range in size from ½ to 1-½ ton and greater. Similarly, vans range from small to very large, and generally have two or four doors with a single or split door in the rear. A common problem, as pointed out above, with pickups, vans and emergency/utility/sports utility vehicles is a lack of hidden storage space (no trunks). Once access to the interior of such a vehicle is made, one also has access to any hidden storage areas therein.

In recent years, and in addition to pickup trucks, utility vehicles, such as the Suburban made by General Motors Corporation, sports utility vehicles, such as the Bronco or Explorer made by Ford Motor Company, and vans (both mini and full size) such as the Caravan made by Chrysler Corporation, have been popular vehicles for both work and personal use. Also, emergency vehicles, both of the van type and the truck type (cab and bed), regardless of size, have no hidden (trunk type) storage, and access to the interior thereof enables one to any medical supplies or equipment, drugs, etc. which may need to be carried in emergency vehicles. Hereafter the term vehicle is intended to include all such vehicles, as well as trucks and trailers having side panels, and the term side panel includes all contoured or straight (non-contoured) sides of such vehicles with or without fender sections. Many of these vehicles are equipped with four wheel drive and thus are widely used for camping, ski outings and emergency applications, with some of the larger vehicles equipped with dual rear wheels. However, a drawback of these vehicles is a lack of storage space, particularly, for example, when families of four to six people travel. As a result on ski outings, for example, the skis, ski poles, etc. are mounted on the top of the vehicle and are thus exposed to the environment and theft. If, for example, skis, etc. are to remain with the vehicle overnight, safety ad security requires that the skis, etc. be removed from the top of the vehicle and placed inside the vehicle. Many emergency type vehicles need to carry equipment which takes up considerable interior space, as well as medical supplies, etc. which are accessible to theft. Mere breakage of a window in a vehicle, for example, enables access to the interior thereof and theft of the skis, other equipment, etc. in the vehicle.

By incorporation of the hidden storage system in such vehicles, skis, ski poles, etc., or water skis, surfboards, boards, emergency equipment supplies, etc., for example, may be safely stored in the vehicle, and thus one gaining access to the interior of the vehicle does not have access to the storage area. Access to the storage area is only through a hinged/locked side panel section of the vehicle. Most vehicles of the type considered herein have sufficient length between a side door and the rear of the vehicle to enable incorporation of the hidden storage area without adversely affecting the interior space of the vehicle. Also, by the elimination of exposed lock/latch mechanisms, the storage compartments are not readily recognized by those inclined toward theft. While the addition of a key slot for the hinged side panel sections has been shown, such would reduce the hidden advantages of the storage system and increase the potential for theft therefrom.

Figure 2:
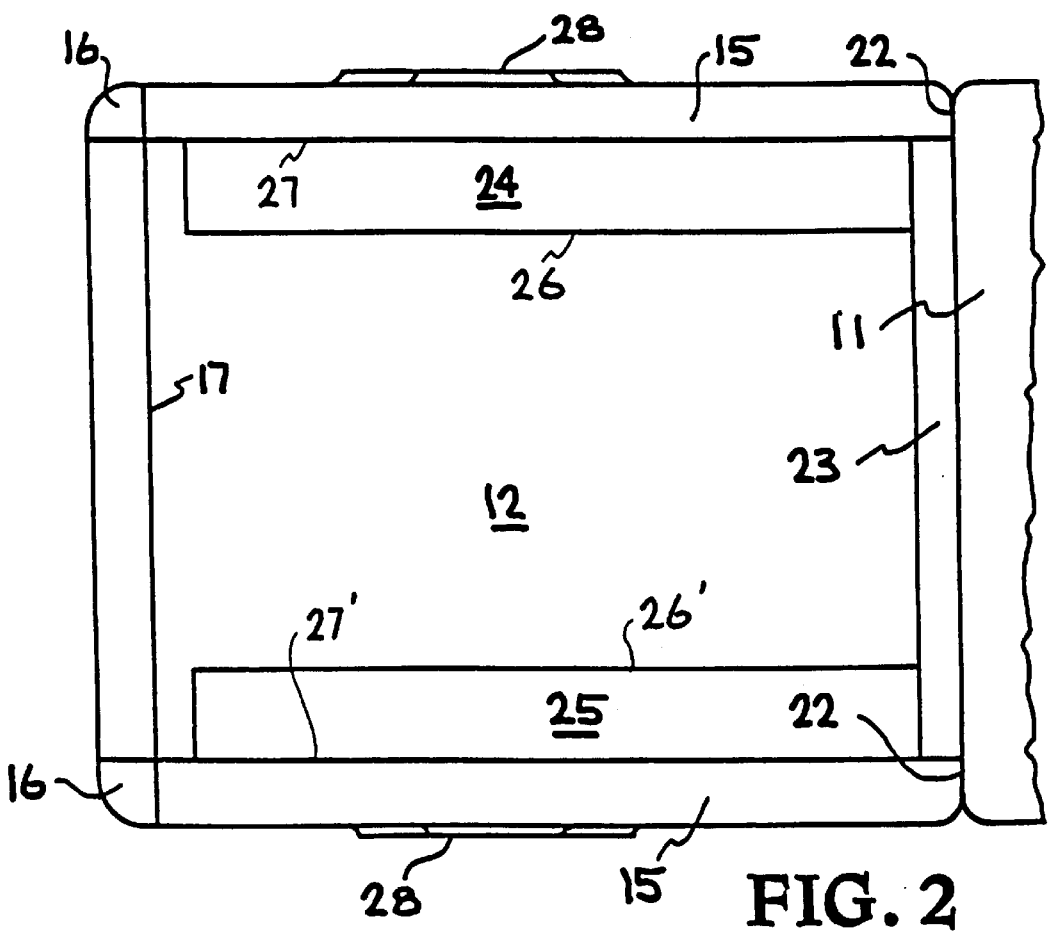

Thus, while the hidden storage system of the above-referenced U.S. Pat. Nos. 5,567,000 and 5,823,598 provide a "trunk-with-a-trunk" for a vehicle bed and for vans, utility/emergency vehicles, etc., the present invention provides improvements in the hidden storage system, particularly with respect to the hinged side panel sections and the shelving arrangement for the storage boxes. Note that as shown in FIG. 2, the side panels include a fender section. The hidden storage also serves to provide means to remove and store unrestrained articles from inside the vehicle, thereby improving passenger safety. The hidden storage may be incorporated above the wheel well or forward of, rearward of and above the wheel well, or combinations thereof.

The hidden storage system of the present invention may be fabricated from various materials including metals, fiberglass, reinforced plastics and combinations thereof as these various materials are now commonly utilized for various components in vehicle manufacturing.

The hidden storage may be incorporated by various methods, such as by an assembly line method or a conversion (retrofit) method similar to the techniques described and claimed in above-referenced U.S. Pat. No. 5,784,769 and U.S. Pat. No. 5,819,390. Also, the components for the hidden storage system may be fabricated and/or assembled using a modular method similar to the technique described and claimed in copending U.S. application Ser. No. 08/896,388 filed Jul. 18, 1997 entitled "Hidden Storage/Utility System Modular Fabrication Method" and U.S. application Ser. No. 09/183,851 filed Oct. 30, 1998 entitled "Modular Fabrication and Assembly Method For Vehicle Hidden Storage System".

While the invention is illustrated and described hereinafter for a pickup bed, it can be incorporated into most vehicles of the type described above, it being recognized that vehicles having two doors on each side rather than a single door leaves less length between the rear door and the rear of the vehicle, and thus less space for hidden storage. Also, vehicles designed for the carrying of passengers, which include windows along the side, provide less space for incorporation of the hidden storage system than similar vehicles not designed for passenger use, but the system can be installed in the passenger type vehicles.

Figure 1:
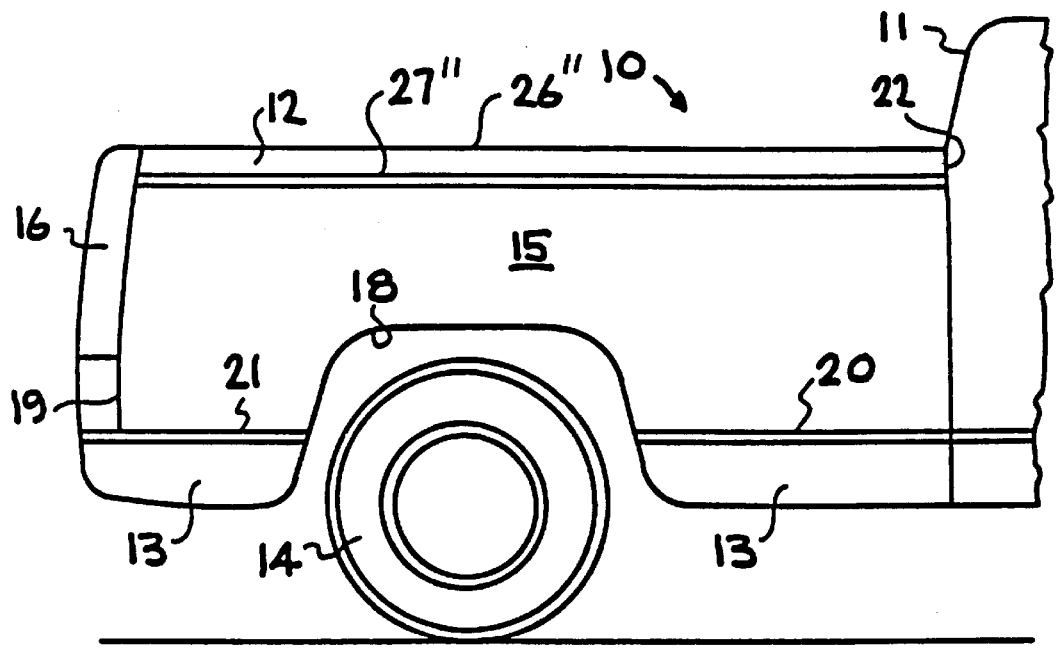
FIGS. 1 and 2 illustrate a side view and plan view of a bed of a hidden storage system of a pickup truck generally similar to that described and illustrated in above-referenced U.S. Pat. No. 5,567,000 and U.S. Pat. No. 5,823,598.
Figure 21:
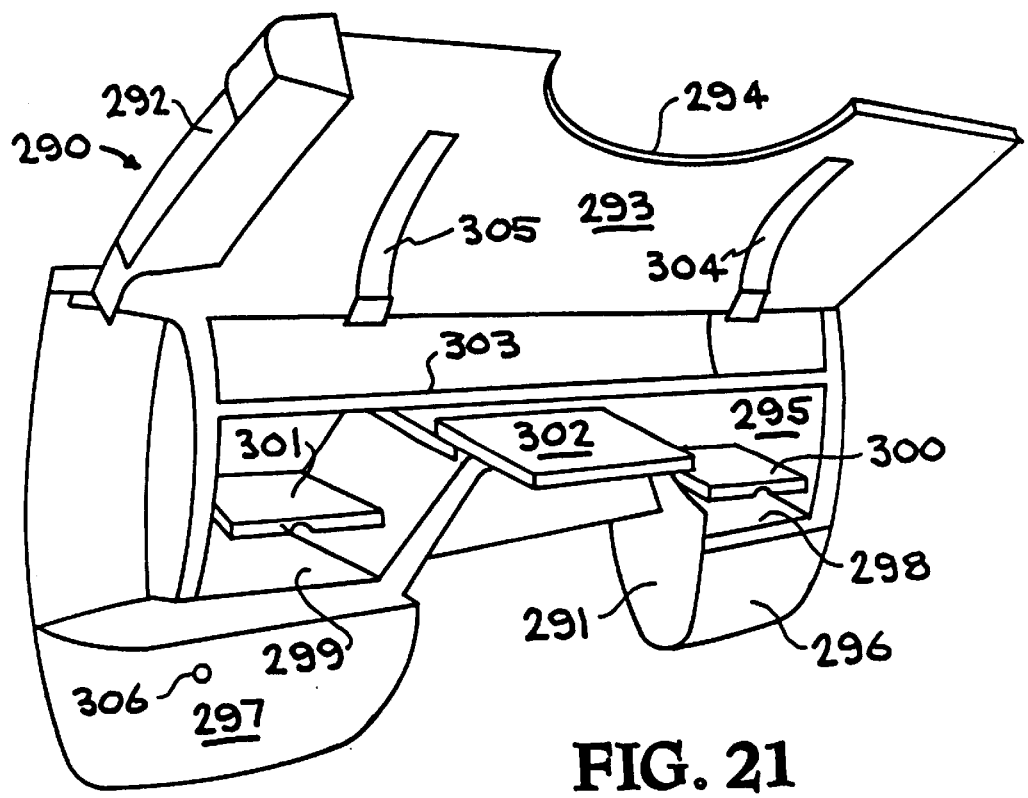
FIG. 21 is a side view of a pickup bed hidden storage system wherein the hinged side panel includes the taillight assembly and wherein covered bins are located forward and rearward of the wheel well.

In view of the extension of the hidden storage system of above-referenced U.S. Pat. No. 5,567,000 and U.S. Pat. No. 5,823,598 to vans and emergency/utility/sports utility vehicles, again referred to hereinafter generically as vehicles, FIGS. 1 and 2 illustrate side and plan view of the hidden storage system incorporated into a bed of a pickup truck. As seen in FIG. 1, from a side view, the only alteration to the normal exterior side panel appearance is the single vertical line or cut below the taillight indicating the rear edge of the hinged side panel, the front edge of the hinged side panel extending to the front of the bed. In other configurations, such as shown in FIGS. 10 and 21, the taillight section is incorporated into the hinged side panel. The hinge or hinges for each side panel or side panel sections are located on an inner area of the side panel along the upper section, lower section or vertical section thereof so as not to be exposed to one viewing the bed from an external side position, and may be of a piano hinge type or a spring-loaded type such as seen in FIG. 21. Thus, one would not readily recognize the modification of the bed, and therefore those with intent to steal tools, etc. from the vehicle would not recognize the hidden storage arrangement.

Referring now to the drawings, FIGS. 1 and 2 illustrate a conventionally appearing pickup truck generally indicated at 10 having a cab 11, bed 12, frame or undercarriage 13 and includes hinged side panels 15, a taillight arrangement 16, a hinged tailgate 17 and wheel wells 18. However, the bed 12 of FIGS. 1 and 2 has been modified to incorporate a hidden storage system, with the only indication of such modification being the cut, small space, or lines 19 in the side panels 15 below taillight 16, as shown in FIG. 1, with the side panel being closed. Note that in this embodiment the hinged side panels 15 terminate adjacent sections of the trim panel sections secured to the frame or undercarriage 13 as indicated by the lines 20 and 21, and the front edges of the hinged bed side panels are indicated at 22, where the side panels 15 contact a front panel or bulkhead 23 of the bed 12. Storage boxes 24 and 25 are located within the bed 12 and extend over, forward of and rearward of the wheel wells 18, and may extend from bulkhead 23 to tail-gate 17 or terminate at any desired length. The storage boxes 24 and 25 are secured as by welding, structural adhesive bonding, etc., as known in the art, to bed 12 along lines 26 and 26' and to the side panels 15 along the lines 27 and 27'. Side panels 15 includes fender sections 28. Note that the storage boxes do not extend to the top rail 26" as indicated by line 27". If desired, the storage boxes may be located only forward of or only rearward of the wheel wells, or be located above the wheel wells and extend horizontally forward and/or rearward from the wheel wells.

FIGS. 3 and 4 illustrate an embodiment of a pickup truck bed having side opening doors which allows access to the bed through the side panels, and may be covered by a removable cover or a camper unit, and includes one or more structural yokes to strengthen the side panels. The side opening doors, which constitute sections of the side panel of the bed, are hinged vertically to enable them to open sideways when, for example, a camper unit extends outwardly from the top of the bed. However, the side doors may be hinged horizontally, if desired, and if hinged along a lower edge, may open downwardly to form a table or workbench. If the side doors were hinged to open upwardly or downwardly, then a strut assembly or a foldable mechanism, such as used on a pickup bed tailgate, would be attached to the doors to maintain the doors in open position.

Figure 16:
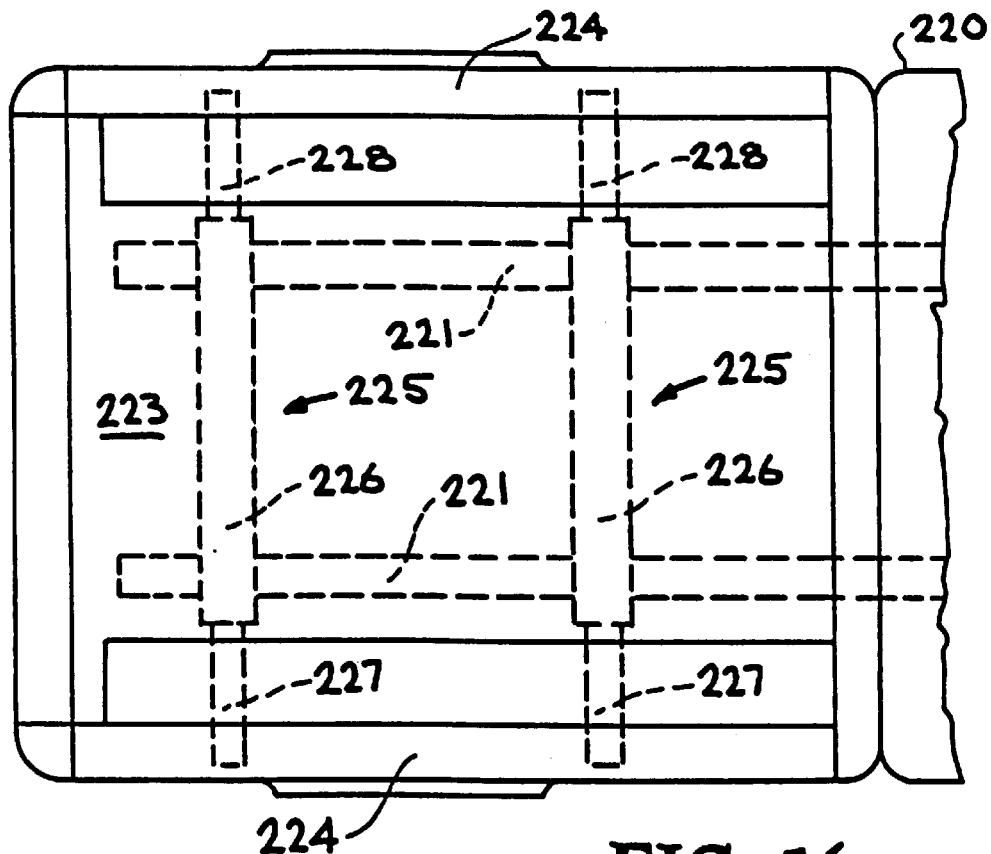
FIG. 16 is a top view of a pickup bed illustrating by phantom lines a collapsible beam support assembly located beneath the bed, and which can be used, for example, with dual rear wheels.
Figure 17:
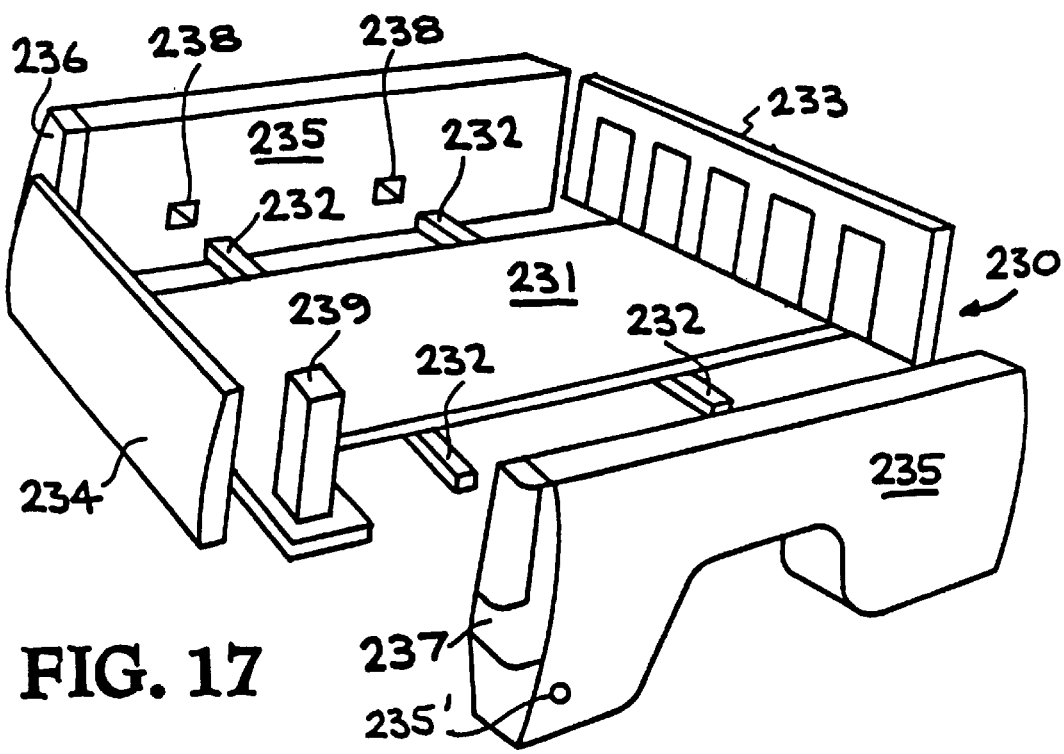
FIG. 17 is an exploded view of the pickup bed of FIG. 16 illustrating openings in the side panels of the bed into which the collapsible beams of the support assembly extend and in which a hidden storage system is mounted.

The pickup bed of FIG. 3, generally indicated at 30, includes a floor, a front section of bulkhead 31, a tailgate 32 and a pair of side panels generally indicated at 33 and 34 having wheel wells 35, only one shown. The bed 30 may be provided with collapsible support 225 beams under the floor as shown in detail in FIG. 16, and may be constructed in modular form as shown in FIGS. 16 and 17.

To provide structural support, the bed 30 includes a pair of yokes or U-shaped members, generally indicated at 36, see FIG. 4, located fore and aft of the wheel wells 35. The structural yokes 36 may be similar to the structural posts utilized at the front and rear corners of the bed to stop the spread of the bed, such as shown in FIG. 17. In some applications, one yoke 36 may be adequate, and the yoke or yokes may or may not engage the top rail of the side panel.

The side panels 33 and 34 each include a pair of hinged sections defining side opening doors 37 and 38 located fore and aft of wheel wells 35. In this embodiment, the doors 37 and 38 are hinged vertically so as to open in a direction indicated by arrows 37' and 38'. As in the embodiments of FIGS. 1–2 and 5, for example, the doors 37 and 38, when closed, provide a continuous contour of the design of the side panels 33 and 34 with the exception of the cut-lines defining the edges of the doors, and are preferably provided with hidden lock/latch mechanisms, as in FIGS. 1–2, whereby the doors do not detract from the appearance of the side panels.

As seen in FIG. 4, the structural yokes 36 include a horizontal section 39 and vertical sections 391, with the horizontal section 39 extending under the floor of bed 30 and vertical sections being located within conventional inner and outer panels of the side panels 33 and 34.

In FIG. 3, the side panels 33 and 34 may be of conventional side panel construction having inner and outer panel sections indicated at 33' and 34' whereby the doors 37 include inner and outer panel sections indicated at 33" and 34", or the inner panel section 34" of each of the doors is removed and the outer panel section 33" reinforced. Also, the doors 37 and 38 on one or both sides may be hinged horizontally to enable the doors to open upwardly or downwardly.

If desired, the embodiment of the vehicle bed of FIG. 3 can incorporate a hidden storage system by providing a storage box with an opening therein adjacent the doors 37 and 38. Also, if desired, the side panels 33 and 34 may include a hinged or sliding section above the wheel wells 35, which can also open into a storage box located above the wheel well section of the floor of the bed 30.

Figure 5:
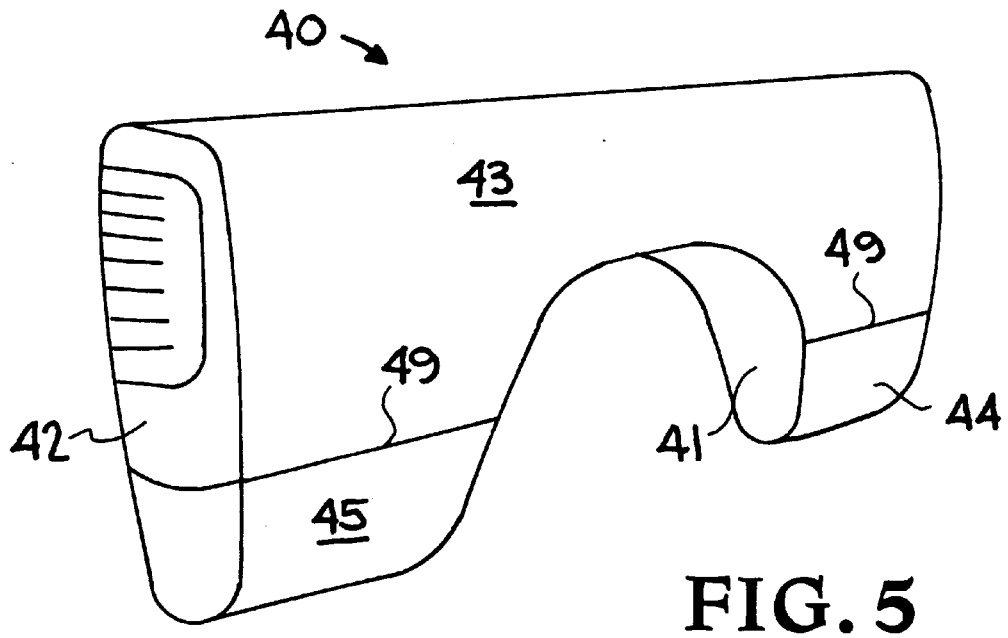
FIGS. 5 and 6 are perspective views of a hidden storage system also utilizing hinged trim panel sections to provide access to storage bins or pockets.
Figure 6:
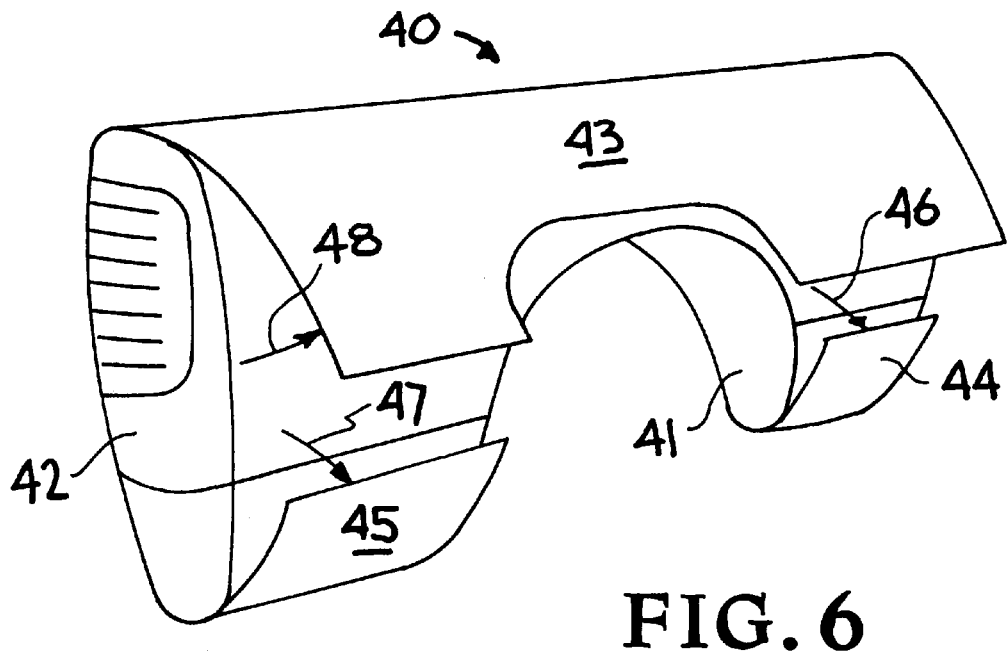
Figure 22A:
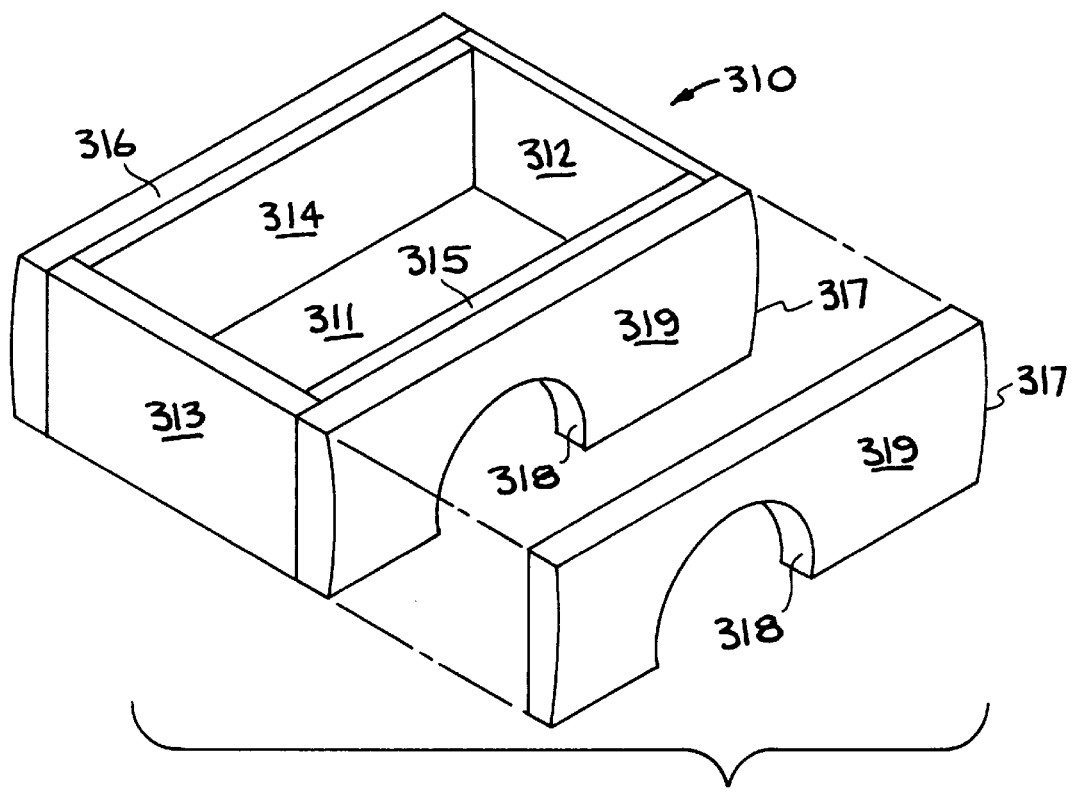
FIGS. 22A and 22B schematically illustrate an embodiment of a universal bed box wherein a single (FIG. 22A) or multiple (FIG. 22B) hinged door storage system may be installed on the bed box as saddle bag type modular components.

FIGS. 5 and 6 illustrate an embodiment of a vehicle bed side panel assembly which may include a storage box, such as the side panels of FIGS. 1–2, and additionally incorporate hinged trim panels which provide access to bins or pockets located fore and aft of the wheel wells. As shown in FIG. 5, the vehicle side panel generally indicated at 40 includes a wheel well section 41, a taillight assembly 42, a hinged side panel section 43, and a pair of lower trim panels 44 and 45. As seen in FIG. 6, the trim panels 44 and 45 are hinged along a lower surface thereof to enable the panels to be opened, as indicated by arrows 46 and 47, and the side panel section 42 is hinged to enable its opening, as indicated by arrow 48. A storage box behind side panel 40 may include various shelving/compartment arrangements, such as shown in FIGS. 13, 15, 18–20 and 21. It is preferred that the side panel section terminates along a line 49 above the lower trim panels 44 and 45 whereby any of components 43, 44 and 45 can be selectively opened, but the components 43–45 can be constructed to overlap the upper edges of the trim panels whereby the side panel section 43 must be opened first. Each of the hinged components 43–45 is provided with a hidden lock/latch mechanism, such as described hereinafter with respect to FIGS. 11 and 12, whereby when closed, there is no indication that these hinged components can be opened. The side panels 40 of either FIGS. 5 or 6 may be fabricated as part of a modular system such as illustrated in FIG. 22A, wherein the side panels 40 constitute a module which is attached to a bed box and that module includes the storage box, wheel well, hinged side panel, or side panel with hinged sections therein, as described hereinafter with respect to FIG. 22B.

Figure 7:
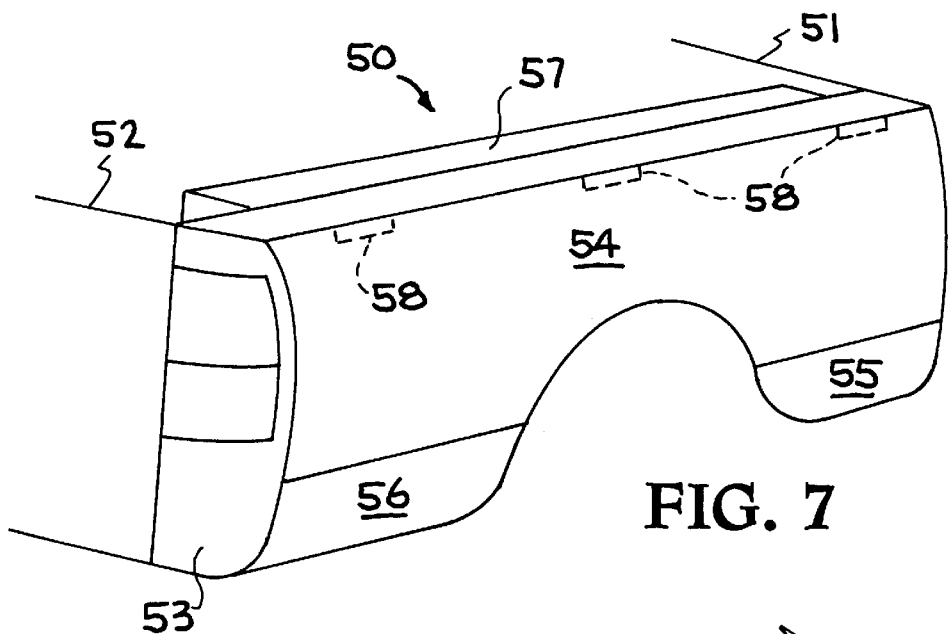
FIG. 7 is a side view of a vehicle bed with a hidden storage hinge system in phantom.

FIG. 7 illustrates an embodiment of a vehicle bed generally indicated at 50 having a bulkhead 51, a tail-gate 52, a tail-light assembly 53, a side panel 54, lower trim panels 55 and 56, and a storage box 57 located adjacent the side panel 54. The trim panels 55 and 56 may be hinged as in FIGS. 5–6 or without hinging, as in FIGS. 1–2. In this embodiment, the side panel 54 is hinged by three spring-loaded hinges 58, shown in phantom, whereby the need for strut assemblies to maintain the side panel 54 open is eliminated. The storage box 57 may include various shelving/compartment arrangements, such as shown, for example, in FIGS. 13, 15, 18–20 and 21. Also, the side panels 54, trim panels 55 and 56, and storage box 57 may be fabricated as a module and secured to the bed floor and bulkhead 51. The side panels 54 may include the lower trim panels 55 and 56, and thus the entire side of the bed may be raised when opened.

Figure 8:
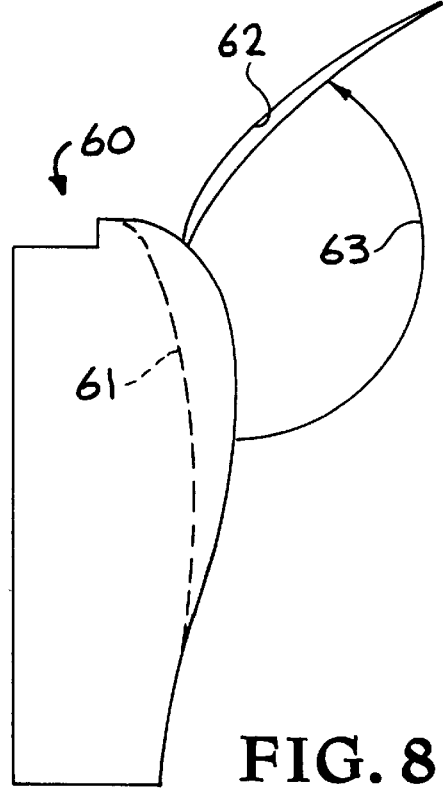
FIG. 8 is an end view of an expanded width vehicle (bed side panel) with a hidden storage system incorporated therein.

FIG. 8 illustrates an expanded width vehicle bed side panel assembly which may include a storage box, the assembly being indicated generally at 60 with the conventional side panel width indicated by the dash line 61. The side panel 60 is provided with one or more hinged sections, indicated at 62 in the raised position, as indicated by arrow 63 provides additional storage space compared to a conventional side panel. It is understood that, as in the embodiments of FIGS. 1–2 and 10, for example, the inner panel of the side panel is removed and only the outer panel is hinged.

Figure 9:
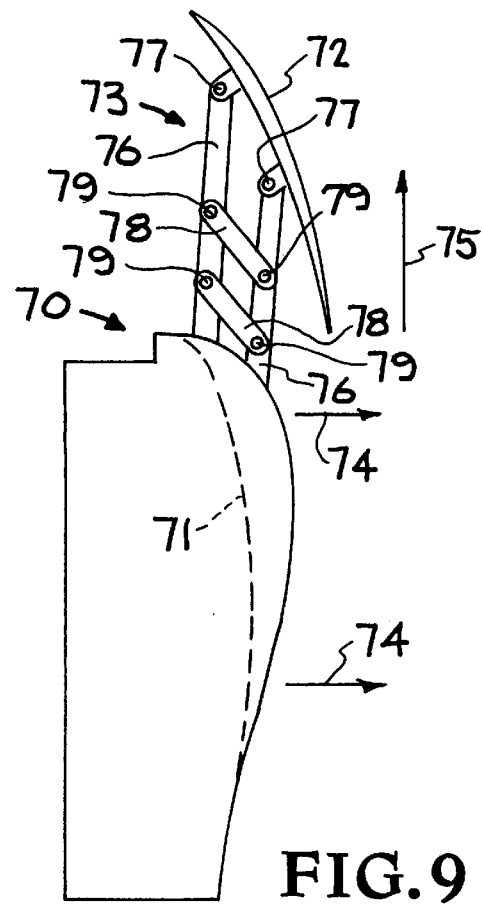
FIG. 9 is an end view of a pickup bed having an expanded width panel section with a pantographic hinged section.

FIG. 9 illustrates another expanded width vehicle bed side panel assembly, which may include a storage box, and is indicated generally at 70, with the width of a conventional side panel indicated by dash line 71. Side panel 70 includes a hinged section 72 via a mechanism 73 which enables the hinged section 72 to move outwardly, as indicated by arrows 74, and then upwardly, as indicated by arrow 75. Mechanism 73 is composed of a pair of members 76 pivotably secured to section 72 at 77 and pivotably secured in a similar manner (not shown) to the side panel 70, or to the storage box, and a pair of cross members 78 pivotably secured to members 76 at 79. Other mechanisms which enable the hinged section 72 of side panel 70 to be moved outwardly and upwardly, as shown in FIG. 9, may be utilized in place of the mechanism 73. The hinged section 72 of side panel 70 may extend along a portion or the entire length of the side panel, such as shown in FIGS. 1 and 21, or it may be utilized as one or more of the hinged side panel sections shown in FIG. 10.

The embodiments of FIGS. 8 and 9, like those of FIGS. 5 and 6, may be constructed as modules and attached to a bed box as described hereinafter with respect to FIGS. 22A–22B and 23A–23B.

Figure 11:
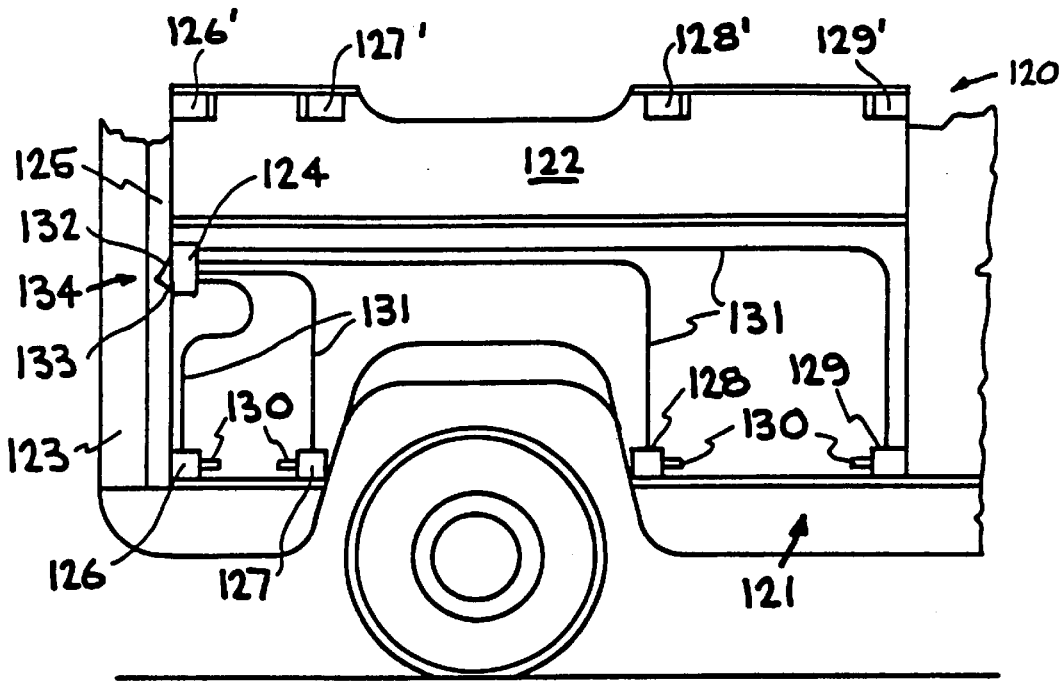
FIGS. 11 and 12 illustrate mechanical and electrical lock/latch mechanisms for the hinged side panels of the vehicle bed.
Figure 12:
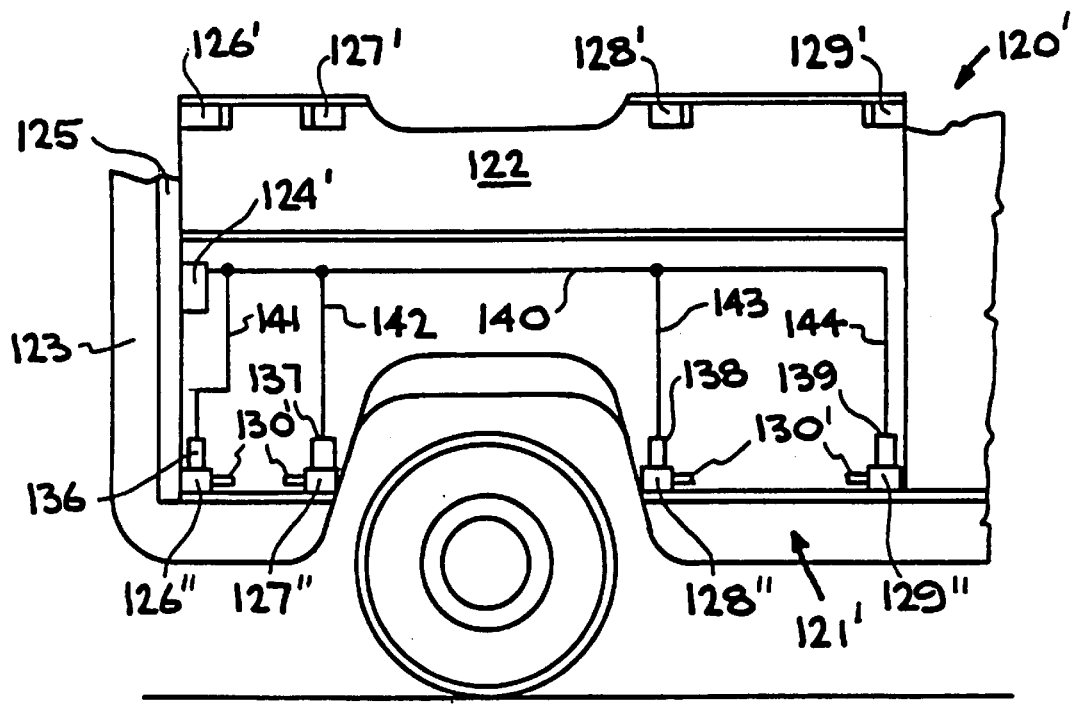

FIG. 10 illustrates an embodiment of a pickup bed similar to FIGS. 1 and 2, with a hidden storage system mounted in the side panels thereof, but with three hinged side panel sections, and wherein the taillight assembly moves with the rearmost hinged side panel section. The bed, indicated generally at 80, is mounted on a frame, not shown, connected to a cab 81, and includes wheel wells, only one shown, at 82. The storage system of FIG. 10, while not shown, includes a storage box as in FIGS. 1–2 and a lock/latch mechanism, as shown in FIGS. 11 and 12. The bed 80 includes side panels generally indicated at 83 on each side, only one shown, and each or either of which include three hinged sections 84, 85 and 86, with hinged section 84 extending from the front edge of the side panel to an area above the wheel well 82, as indicated by vertical cut line 87, hinged section 85 being located above wheel well 82 and defined by cut line 87 and another vertical cut line 88, with hinged section 86 extending from cut line 88 to the rear end of bed 80 and including taillight assembly 89. Each of hinged sections 84 and 86 may be hinged horizontally or vertically so as to open upwardly, downwardly or sideways, and may terminate along lines 84' and 85' or extend to the bottom of trim panel sections 83' and 83". Hinged section 85 is hinged horizontally and thus can be either raised or lowered. If section 85 is hinged at a lower end, it can be designed on the inner surface thereof to provide a work bench, and if hinged at the upper end, one or more slideable compartments or shelves, as described hereinafter with respect to FIG. 15, may be mounted behind the hinged section 85 of the side panel, or if desired, can be hinged to open downwardly with slideable shelves or compartments located therebehind. Also, if desired, the three hinged side panel section arrangement of FIG. 10 can be modified as described hereinafter with respect to FIGS. 13 and 18–21. While not shown, the storage box on each side of bed 80 may have a height equal to the height of the side panels 83, or may have a height less than the height of the side panels, as in the embodiment of FIGS. 1–2. Hinged sections 84, 85 and 86 may be optionally provided with a flush type handle latch or handle 90 and key lock 91, but unexposed latch and lock means as shown in FIGS. 11 and 12 are preferred.

While only one side of the bed 80 has been shown, it is understood that each side of the bed can be equipped as illustrated in FIG. 10, or that the hinged panel sections on one side of bed 80 can be hinged vertically and the other side horizontally, or a mixture of hinged sections, depending on the desire of the user. Also, the opposite side of the bed may only be provided with one hinged panel or with no hinged panels.

FIGS. 11 and 12 schematically illustrate embodiments of a mechanical type and an electrical type of latch/lock mechanism for a hidden storage system of a pickup bed, such as shown in FIGS. 1–2, 5–9, 15, 17 and 20, but the latch/lock mechanism can be utilized in the hidden storage system of any vehicle bed, such as shown in FIGS. 3 and 10. Since the latch/lock mechanism is not visible from an external view of the vehicle, such is considered to be a hidden mechanism and is so defined herein. In the embodiment of FIG. 11, the latch mechanism is cable actuated, but may be actuated by an electrical solenoid in place of the mechanical actuator. As shown, a vehicle indicated at 120 containing a hidden storage system generally indicated at 121 which includes a storage box as above described, and which includes at least one hinged side panel 122 and provided with an end gate or rear door 123, includes a lock release mechanism generally indicated at 124, having a keyed or keyless lock, not shown, and located at the rear of the storage system and spaced as indicated at 125 from the rear door 123. By this arrangement, the lock release mechanism 124 can be actuated from the inside of the vehicle without opening the end gate or door 123. The latch mechanism constructed of cooperating components are indicated at 126–126', 127–127', 128–128' and 129–129', with components 126, 127, 128 and 129 secured to the vehicle 120 or storage box within the enclosed area, while cooperating components 126', 127', 128' and 129' are secured to the inner and lower edge of the hinged side panel 122 such that when the side panel 122 is lowered, the components of the latch mechanism interconnect. The components 126–129 each include a movable release mechanism 124 via a lever 132 of the lock release mechanism 124. Thus, upon movement outwardly of lever 132, as indicated by arrow 133, the cable 131 activates the movable release member 130, where latch components 126'–129' are released from components 126–129, and the hinged side panel 122 can be raised as illustrated. To re-secure the side panel 122 when lowered, the lever 132 of lock release mechanism 124 is moved inwardly, as indicated by arrow 134, whereby the activation cables 131 and release member 130 enable latch mechanism components 126–129 and 126'–129' to be reengaged for retaining the side panel 122 in a secured closed condition. The mechanical lever arrangement 132 may be replaced by a solenoid, which would actuate the control cables in the same manner. Various types of mechanical lock/latch mechanisms are commercially available and thus a detailed description of a specific embodiment is deemed unnecessary. However, the lock/latch mechanism should be constructed to prevent the side panel 122 from being easily pried open. Some known lock/latch mechanisms require a 1500 pound pry to open same.

FIG. 12 illustrates an electrically activated lock/latch mechanism, and is constructed similar to that of FIG. 11 except that electric solenoids and electric leads replace the activation cables of FIG. 11, and the lock release mechanism requires only a push button or key to actuate the latch mechanism via the solenoids. Also, the lock mechanism may be remotely controlled, such as by well known vehicle security key/lock systems. As shown in FIG. 12, the lock release mechanism 124' is located at the rear of the storage box and spaced from the end gate or rear door 123, as indicated at 125. Cooperating latch mechanisms 126'–126", 127'–127", 128'–128" and 129'–129" are mounted on hidden storage system 121' on a vehicle 120' and side panel 122, as described above in FIG. 11. Each of latch mechanism components 126", 127", 128" and 129" are provided with a solenoid 136, 137, 138 and 139 which are connected to lock release mechanism 124' via electrical leads 140, 141, 142, 143 and 144. To release the latch mechanism to enable opening of the side panel 122, the lock release mechanism 124' is activated, such as by a push button, key or combination, as known in the art, which activates solenoids 136–139 thereby moving movable members 130' to allow latch components 126"–129" to be released from latch components 126–129, allowing side panel 122 to be opened. Since solenoid activated lock/latch mechanisms are well known in the automotive art, further description is deemed unnecessary.

While FIGS. 11 and 12 illustrate embodiments of the lock/latch mechanism with the lock release mechanism 124' located at the rear of the storage box, the lock release mechanism can be located at the front of the storage box, or if an electrical lock/release system is used, as in FIG. 12, the lock release mechanism can be located in the glove box, behind the driver's seat, or elsewhere in the vehicle. If desired, a key actuated lock release mechanism can be installed in a hinged side panel section, but such would be visible from an external view of the vehicle and therefore would not be desirable in that the hidden aspect of the storage system would be reduced.

While the FIGS. 11–12 embodiments have illustrated the use of four (4) latch mechanisms, that number may be less for a single hinged side panel. Where the hinged side panel is composed of side panel sections, as in FIGS. 3 and 10, each hinged section should include one or more latch mechanisms, either mechanical or electrical. Also, where the side panel sections are hinged to open downwardly or sideways, the location of the cooperating latch mechanism components would be different and, for example, such may be secured to the sides of the hinged side panel sections and to a cooperating location on the storage box.

As pointed out above, the upwardly opening side panels are provided with means for retaining same in open position, such as by conventional torsion springs or strut assemblies which are widely used in the automotive field for retaining open rear windows or doors. However, hinges which include spring or mechanically biased means, for example, are also commercially available which are constructed to retain a door or window open, and thus could be utilized in the hinged side panels, particularly those that are hinged to open downward or sideways. The use of strut assemblies or spring-loaded hinges are generally preferred for upwardly opening side panels.

The hidden storage system is constructed such that a variety of storage shelves and/or storage compartments may be positioned in the storage boxes on either side of the bed. The storage boxes are provided with means by which shelves or compartments may be installed to fit a user's needs. The storage boxes may include areas of sufficient length and height for the storage of skis, ski poles, ski boots and ski clothing, or for the storage of golf club bags and associated equipment or clothing as well as for various tools, parts, etc. Also, the storage boxes may be designed to include areas for the storage of shopping purchases whereby such are secured from view a truck with a trunk.

Figure 13:
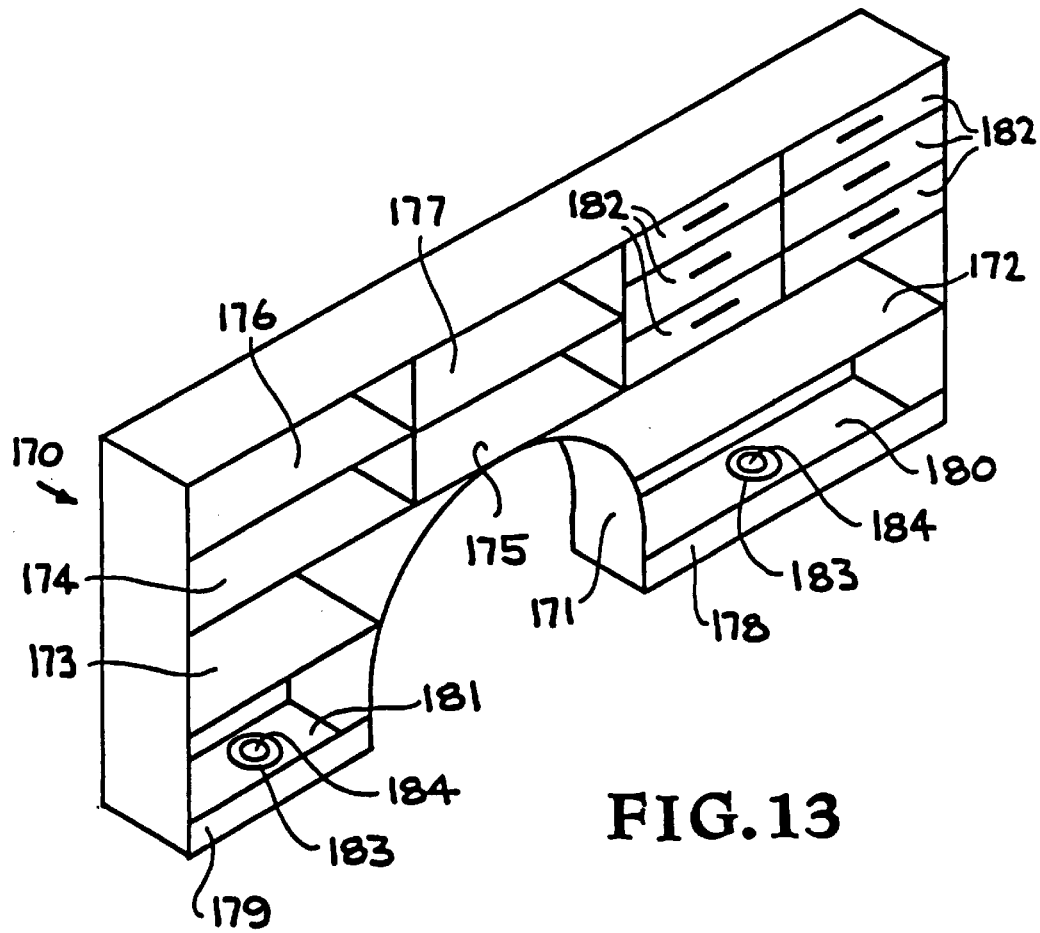
FIG. 13 schematically illustrates a shelving/storage arrangement for the storage box of the vehicles of FIGS. 1–2, 5–10 and 16–17.

FIG. 13 schematically illustrates a shelf/storage compartment arrangement for tools, parts, etc. The shelves and storage compartments may be mounted so as to be movable (slideable) or adjustable. As shown in FIG. 13, a storage box such as illustrated at 25 in FIG. 2, for example, here generally indicated at 170, and which includes a wheel well section 171, is provided with different size and/or length shelves 172, 173, 174, 175, 176 and 177. The storage box 170 is provided with upwardly extending lips or members 178 and 179 which form open boxes or compartments 180 and 181. However, the storage box 170 may be constructed to provide a flat surface at the bottom by elimination of the upwardly extending members 178 and 179. the storage box 170 of FIG. 13 additionally includes six compartments or drawers, indicated at 182, for small parts, etc. Compartments 180 and 181 are provided with openings 183 in which are positioned drain/air relief valve assemblies 184, described in detail hereinafter with respect to FIG. 14. It is understood that the shelf/storage compartment arrangement of FIG. 13 can be incorporated into any of the vehicle beds of FIGS. 1–10 and 17.

Figure 14:
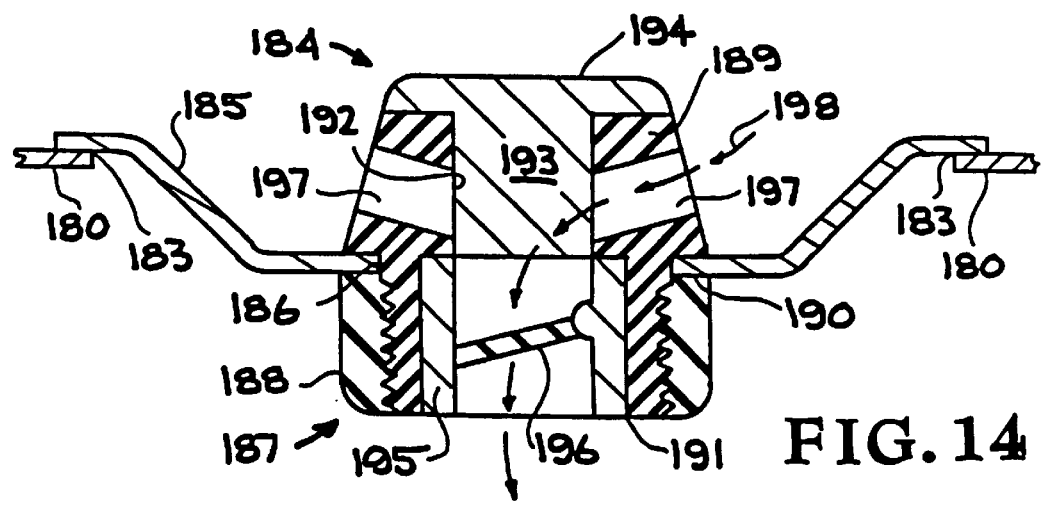
FIG. 14 illustrates in cross-section an embodiment of a drain/air relief valve assembly for the storage box of the hidden storage system.

FIG. 14 illustrates an embodiment of a drain/air relief valve assembly indicated generally at 184 in FIG. 13 which is mounted in an opening 183 in compartments 180 and 181 of storage box 170. The valve assembly 184 is mounted in opening 183 of compartment 180, for example, by a tub or member 185 having an opening 186 and is secured in opening 183 at the outer periphery thereof, and may be constructed of metal, a composite or plastic, for example. Valve assembly 184 includes a housing 187 or body members 188 and 189 secured together as by a threaded connection, not shown, with lower body member 188 having a groove 190 therein into which tub 185 extends, whereby the housing 187 is retained in opening 186 of tub 185. The housing 187 may be constructed of EPDM or rubber, for example. Body members 188 and 189 are provided with aligned openings 191 and 192, with a plug or member 193 having a pull grip 194 extending into opening 192. Opening 191 in lower body member 188 is provided a valve 195 having a flexible member 196, while upper body member 189 is provided with a plurality of radially extending openings 197. Flexible member 196 may be constructed of rubber, for example. Upon raising the plug 193 via the pull grip 194, water and/or air within compartment 180 of storage box 170 flows through radial openings 197 and moves downwardly (opens) flexible member 196 of valve 195, as illustrated by flow arrows 198. With the plug 193 in place, as shown in FIG. 19, air or moisture will not pass upwardly due to seating of flexible member 196 of valve 195.

Figure 15:
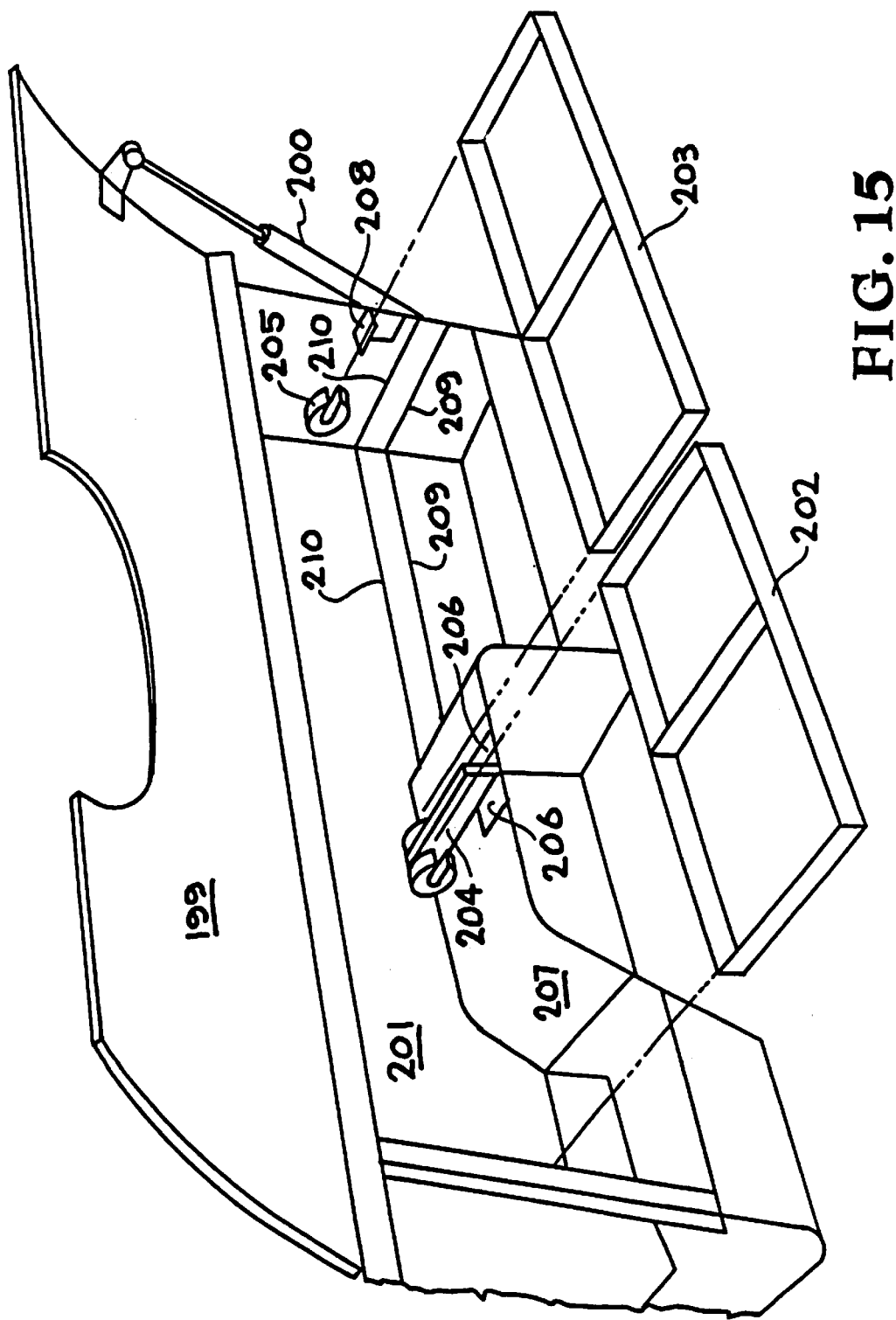
FIG. 15 illustrates an adjustable and/or slideable shelving arrangement for the storage box of the vehicle.

One of the side panels of a vehicle bed which may be used in any of FIGS. 1–10 and 17, for example, is shown in detail in FIG. 15 wherein a side panel 199 is illustrated in an open position and retained by a gas lift or strut assembly 200 (only one shown). As seen in FIG. 15, the side panel assembly, which can be fabricated as a module, additionally includes a storage box 201 into which are slideably mounted shelves or box shelves 202 and 203, which are supported by a common support member 204 and include flange sections, not shown, which extend into slots in member 204 and in a pair of end support members 205 (only one sown). The adjacent or inner ends of slideable shelves 202 and 203 slide on members 206 secured to the wheel well 207, while the outer or opposite ends of shelves 202 and 203 slide on member 208 (only one sown) secured to ends of the storage box 201. The storage box 201 is additionally provided with shelf supports 209 and 210 on which a shelf (not shown) can be mounted whereby the height thereof can be adjusted for various uses. If desired, support members similar to member 205 can be located at 209 or 210 to enable the uses of additional sliding shelves. Also, vertical adjustable shelf supports may be utilized. It is understood that the shelf arrangement of FIG. 15 can also be incorporated into the vehicles of FIGS. 1–10 and 17.

The vehicle bed as illustrated in FIGS. 1–4 and 10, for example, may be provided with support/safety mechanisms, as illustrated in FIGS. 16 and 17, which comprise a pair of collapsible beams. Upon impact from a side of the storage system, the beams collapse rather than bending, thereby preventing rupture or puncture of a fuel tank, typically located beneath the bed of a pickup truck.

As seen in FIGS. 16 and 17, a vehicle 220, such as a pickup truck having frame members 221 and wheels mounted on an axle (not shown) is provided with a bed 223 having side panel/fenders 224. A pair of collapsible support beams 225 are mounted across the frame members 221 and extend outwardly so as to terminate inside the side panel/fenders 224. As seen in FIG. 16, each of the collapsible support beams 225 is composed of a central section 226 and end sections 227 and 228 that are constructed to extend into central section 226. Beams 225 may be square, rectangular, circular, etc. in configuration. The length of the central section 226 and the length of end sections 227 and 228 is determined by the width of the bed 223. The end sections 227 and 228 may be spot welded, for example, at a desired point to central section 226 and upon impact, the spot weld is broken and the impacted end section collapses into the central section 226 which prevents the bed 223 from bending downward toward the fuel tank located beneath the bed.

FIG. 17 illustrates a modular assembly approach for the bed of FIG. 16 utilizing the collapsible support members or beams. As shown schematically in FIG. 17, the bed generally indicated at 230 is basically composed of five modules or assemblies comprising a floor assembly 231 to which collapsible support beams 232 are mounted or connected, a bulkhead assembly 233, a tailgate assembly 234 and a pair of side panel assemblies 235 having connected thereto taillight assemblies 236 and 237 respectively. Side panel assemblies 235 are provided with openings 238 into which collapsible support beams 232 extend. Floor assembly 231 includes a pair of support posts 239 (only one shown) to which the rear of side panel assemblies 235 are secured. The side panel assemblies 235 may be constructed as illustrated in FIGS. 1–2, 5–9 or 18–21, for example, or constructed to include a plurality of hinged side panel sections as in FIG. 10, which may open upward, downward or sideways. If desired, an optical key entry or slot 235' may be incorporated into side panel assemblies 235 to release the side panel.

FIGS. 18 and 19 illustrate side panel assemblies which include a slideable/collapsible shelf support structure whereby a shelf, tray or work surface may be stored within a storage box of a hidden storage system, and when the hinged side panel is raised, the support structure may be pulled outwardly and upwardly to establish support for a shelf, tray, work surface, etc. As shown, a vehicle bed side panel 250 having a hinged section 251 is provided with a collapsible support structure, generally indicated at 252, and includes at least two sets of members 253 and 254 (only one set shown) constructed to enable member 254 to slide within member 253, with member 253 being secured to a storage box of the vehicle side panel 250, which may be constructed as shown in FIGS. 1–2, 5–10 and 17, for example. Pivotably mounted to slideable members 254 are two pairs of connector members 255 and 256 (only one of each shown), as by pins 257 and 258, with connector members 255 and 256 being pivotably mounted to a pair of support members 259 (only one shown) as by pins 260 and 261. A shelf, tray or work surface (not shown) is adapted to be positioned on support members 259 and can be fixed thereto or be of a removable type.

As shown in FIGS. 18 and 19, the slideable member 254 may be moved with respect to fixed member 253, as indicated by arrow 262, and connector members 255 and 256 pivoted as indicated by arrows 263 and 264 whereby the support member 259 of support structure 252 can be positioned in its ready position, as shown in FIG. 18, or its collapsed position, as shown in FIG. 19, wherein the hinged side panel section 251 is closed over the support structure 252.

FIG. 20 illustrates an embodiment of a side panel assembly having a pivotable shelf mounted with a hidden storage system of a vehicle bed side panel, and may be utilized in any of the illustrated side panel embodiments. As shown, the vehicle bed side panel, indicated at 270, includes a storage box 271 and a hinged side panel 272 which, in this embodiment, has a tail-light assembly 273 mounted to the hinged side panel 272. The side panel 270 also includes trim panel sections 274 and 275 fore and aft of wheel well 276, behind which are located storage bins 277 and 278, described in greater detail with respect to FIG. 21. Over the wheel well 276 is positioned a tray, shelf or work surface 279 pivoted as indicated by arrow 280 about a point or pin 281 along a slide support 282. Various types of slide supports 282 may be utilized to maintain support of the shelf 17 when in the position shown by phantom lines.

FIG. 21 illustrates a side view of a side panel assembly having a hidden storage system mounted on one or both sides of a vehicle, such as a pickup bed illustrated in FIGS. 1-9 and 17. If mounted in the side panel of a pickup, for example, the pickup bed may be constructed as a modular assembly, such as illustrated in FIGS. 17, 22A–22B, or 23A–23B, with or without the collapsible support members of FIGS. 16–17. The side panel of FIG. 21, indicated generally at 290, includes a wheel well 291 and a tail-light assembly 292 which is secured to a hinged side panel section 293. The hinged side panel section 293 includes a cut away section 294 that corresponds to and cooperates with the wheel well 291. The side panel 290 includes a storage box 295 which extends over and fore and aft of wheel well 291, and with the fore and aft sections of unhinged sections 296 and 297 defining bins 298 and 299 having hinged lids 300 and 301. The remainder of the storage box provides a space above the bins 298 and 299 and above the wheel well 291 in which shelves or compartments may be installed, such as illustrated in FIG. 13. As shown in FIG. 21, a sliding shelf 302 is mounted above the wheel well 291, and which may serve as a work top, and a shelf 303 extends along the length of the storage box 295, and which may be of an adjustable type. The hinged side panel section 293 is retained open by spring-loaded type hinge assemblies indicated at 304 and 305, but strut assemblies, such as illustrated in FIG. 15, may be utilized with one or more horizontally extending hinges along an upper edge of the side panel section 293. While not shown, each of the bins 298 and 299 may be provided with a drain/air relief valve assembly, as illustrated in FIGS. 13 and 14. Also, a seal assembly (not shown) would be located adjacent the periphery of the hinged side panel section 293 when closed, and may be of a heated type, such as described and claimed in copending U.S. application Ser. No. 09/082, 436 filed May 20, 1998 entitled "Vehicle Compartment Seals". If desired, an optional key entry indicated at 306 may be installed to release side panel section 293. As shown, the hinged side panel section 293 extends from the forward lip or end of the side panel 290 to the rear end of the bed and includes the taillight section 292, which is electrically connected by an electrical harness (not shown) which allows the taillight section 292 to be raised with the side panel 290.

The embodiments of FIGS. 18, 19, 20 and 21 may be fabricated as modules and mounted to the bed of a vehicle as shown in either FIG. 17 or in FIGS. 22A–22B and 23A–23B described hereinafter. Modular fabrication and assembly is generally more economical than assembly line production or vehicle bed conversion methods.

Figure 22B:
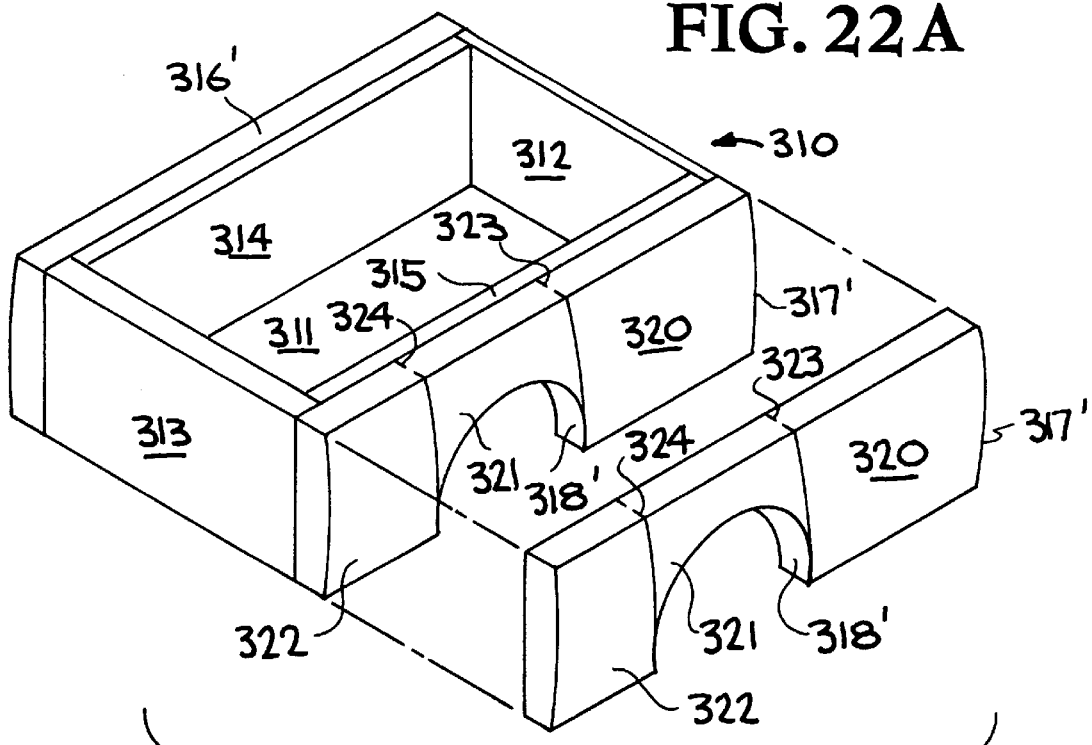

FIGS. 22A and 22B illustrate an embodiment of a hidden storage system which utilizes a universal or standard vehicle bed box to which modules containing the storage system are attached, thus a saddle bag type modular assembly. Each of FIGS. 22A and 22B show the storage system in the mounted position and in an exploded position. The difference between FIGS. 22A and 22B lies only in FIG. 22B having a plurality of hinged side panels, similar to that of FIG. 10. It is understood that FIGS. 22A and 22B have storage systems on each side of the bed box and each side may have a single or a multiple hinged side panel arrangement, or that one side may be a single hinged storage system and the other side be a multiple hinged storage system. As shown, the vehicle bed box, generally indicated at 310, is constructed to fit any size or model vehicle and includes a floor section 311, a bulkhead section 312, a tail-gate section 313, and a pair of thin side sections 314 and 315 which may be supported, for example, by U-shaped members, as shown in FIGS. 3 and 4. A pair of storage assemblies 316 and 317, each including a wheel well section 318 and a horizontally hinged side panel section 319, are mounted to the side sections 314 and 315. While not shown, the side panel section includes a taillight section, as in the FIG. 21 embodiment.

FIG. 22B differs from FIG. 22A only in that the side panel section 317' includes three hinged sections 320, 321 and 322, and corresponding reference numerals are given. Hinged sections 320 and 322 may be hinged horizontally to move in an outward direction, either upwardly or downwardly, as in FIG. 10, or hinged vertically to move in a sideways direction, as in FIG. 3. The center hinged section 321 may be hinged to swing upwardly or downwardly. It is understood that each of the hinged side panels or side panel sections are provided with appropriate hinges, lock/latch mechanisms, and with strut assemblies for maintaining same in an open position, where needed. Also, the assemblies 316' and 317' may be composed of three modules each which include hinged sections 320, 321 and 322, as indicated by dotted lines 323 and 324.

Figure 23A:
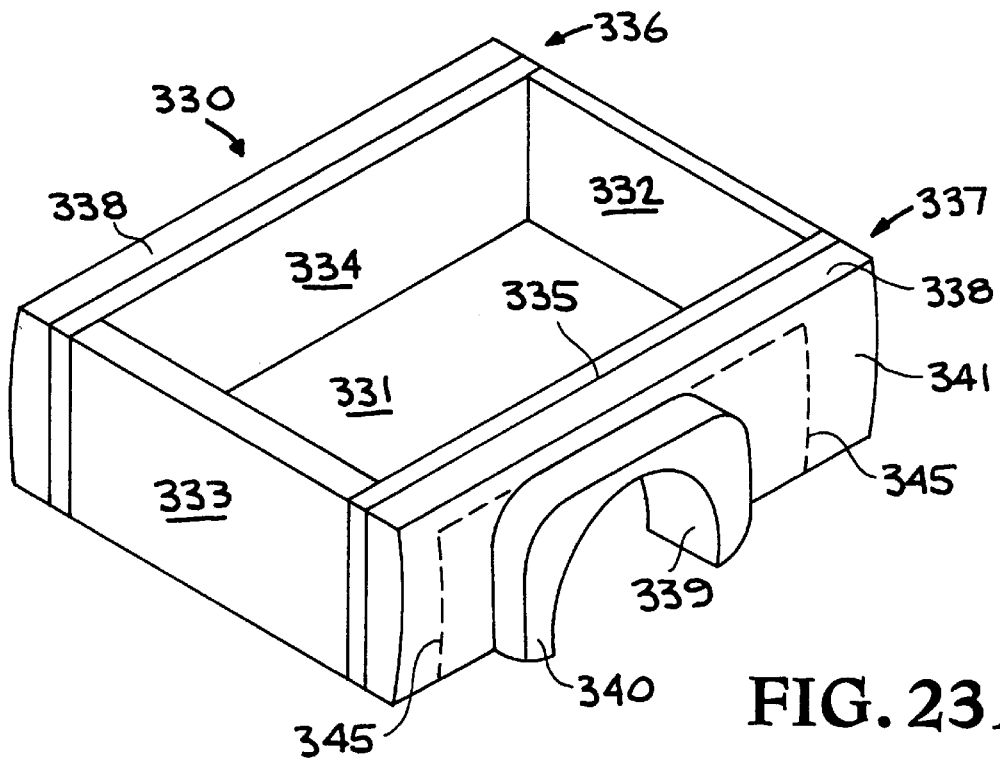
FIGS. 23A and 23B illustrate a side panel of a dual wheel truck with the storage system incorporated therein, with single or multiple hinged side panel sections.
Figure 23B:
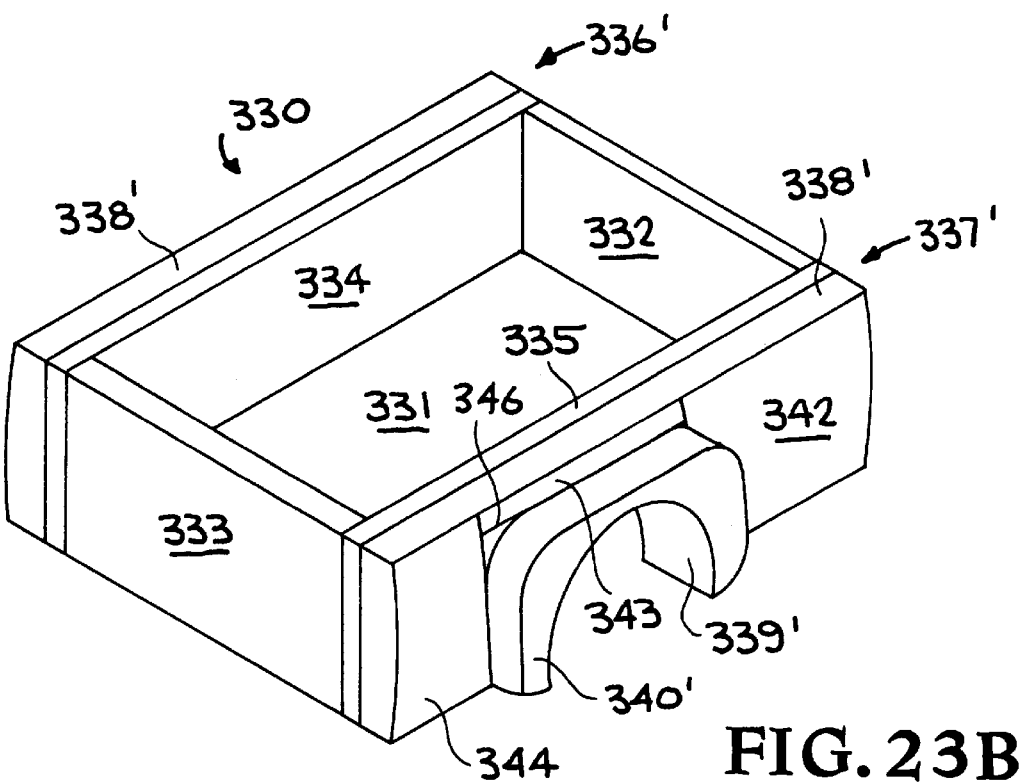

FIGS. 23A and 23B illustrate a storage system for a dual wheel truck arrangement, utilizing a universal or standard vehicle bed box, as in the FIGS. 22A–22B embodiments, and with a saddle bag type modular storage assembly attached to the bed box. The primary difference between the embodiment of FIGS. 23A–23B and FIGS. 22A–22B is the width of the storage system and the fender arrangement for a dual wheel vehicle, such as a 1 ton or greater truck. As shown in FIG. 23A, the embodiment comprises a vehicle bed box constructed to fit, for example, any manufacturer's vehicles having dual rear wheels, is generally indicated at 330 and includes a floor section 331, a bulkhead section 332, a tail-gate section 333, and side sections 334 and 335. A pair of storage assemblies, generally indicated at 336 and 337, are mounted to side sections 334 and 335 of bed box 330. As described above with respect to FIGS. 22A–22B, the side section may be supported as needed. Each of storage assemblies 236 and 337 include a storage box 338, a wheel well section 339, a fender section 340, and a hinged side panel section 341, which may or may not include the fender section 340. The fender section 340 may be of an elongated configuration of a tapering or curved longitudinal and vertical configuration which extends along a substantial length of the side panel of the bed, as indicated by dotted line 345. In this embodiment, a taillight assembly, not shown, is mounted in either storage box 338 or connected to hinged side panel section 341, as in the previously described embodiments. The hinged side panel sections 341 may be hinged horizontally, for example, by piano-type hinges or spring-type hinges, and provided with lock/latch mechanisms and strut assemblies, as previously described. The storage can extend into the housing or fender section 340 over the dual wheels.

The FIG. 23B embodiment differs from FIG. 23A only in the construction of the side panels of the storage assemblies 336 and 337, and corresponding reference numerals are provided for corresponding components. The storage assembly 3371 of FIG. 23B includes three side panel sections 342, 343 and 344. Side panel section 343 may include the wheel well section 3391 and fender section 340', or it may be cut along the line 346 located above the fender section 340'. Side panel section 343 may be horizontally hinged to open upwardly or downwardly. Also, the center side panel section 343 may be connected to a slidable box assembly located within storage box 338'. The side panel sections 342 and 344 each may be hinged horizontally or vertically to open either upwardly or downwardly, or open sideways in either direction. The side panel 336' may be constructed as side panel section 337', as described above, or provided with a single hinged side panel section, as in FIG. 23A.

It has thus been shown that the present invention provides a hidden storage arrangement for vehicles, as well as side access to the interior of a vehicle bed that can be initially built into the vehicle, such as a pickup truck bed, or a conventional bed can be converted to include the storage and/or the side access arrangements, without substantially altering the external appearance of the vehicle or the bed, compared to a vehicle or bed without the storage or side access arrangements. Thus, a pickup truck bed, van, emergency or sports utility vehicles can now be provided with a trunk which can be latched and locked and is only accessible via one or more hinged side panel sections, which can be hinged to open upwardly, downwardly or sideways. While the invention has been described with respect to a pickup bed, it can be used in other types of vehicles, as described in above-referenced U.S. Pat. No. 5,823,598, as well as being used in full-sized truck beds and trailers having side panels, without detracting from the normal appearance of the side panels except in some instances where vertical and/or horizontal cuts are needed. While the hinged side panel or side panel section(s) generally extend to the lower trim panel sections fore and aft of the wheel wells, the hinged panel or section may include one or both of the trim panel sections, and may or may not include the fender section of the bed, depending on the configuration of the fender sections. Also, as shown, the hinged side panel or panel section may include the taillight assembly. The entire side of the bed may be hinged including the trim panel sections.

While specific embodiments of hinged side panels or side panel sections, along with various types of hinge arrangements in addition to shelving, bins, adjustable or pivotable shelves and support structure therefor have been illustrated and described to exemplify and teach the principles of the invention, such are not intended to be limiting. For certain applications, only one storage box may be desired, or the storage box may be formed in sections or located entirely above the wheel well. The exact configuration of the storage or side access arrangements will depend on the desired use and different fender/side panel/frame/undercarriage arrangements of the vehicle involved.

While not shown, the hinged panel sections may be structurally reinforced and coated on the inner surfaces thereof with insulating and/or sound absorbing materials conventionally used in the automotive field. If desired, the interior of the storage boxes may be coated with similar materials While not shown, the edges of the side panels adjacent the hinged panel sections may be provided with seals, similar to the seals utilized for automotive trunks, to prevent moisture or dust from entering the storage boxes when the hinged panel sections are closed. Since the lock and/or latch mechanism for the hinged side panel sections are not visible from an external view of the vehicle, they constitute a hidden latch mechanism. However, if desired, the lock, such as a key actuated mechanism, may be installed in a side panel section and thus would not be hidden from view. If desired, the lock/latch mechanisms may be of a spring-loaded type whereby upon release of the latch, the hinged side panel section opens slightly. Also, the lock/latch mechanisms may be of the pull-type which draws the hinged side panel section into a locking position. Such latching mechanisms are known in the art.

Modifications and changes may become apparent to those skilled in the art, and it is intended that the invention be limited only by the scope of the appended claims.

What is claimed is:

1. In a truck bed having a floor, a bulkhead, a tailgate, and side panels, the improvement comprising:
    at least one of said side panels having at least one hinged section therein, and
        lock/latch mechanism for said at least one hinged section,
        said hinged section being constructed and hinged to move outwardly and such that there is substantially no change in an external appearance of the at least one side panel compared to an identical side panel without said hinged section,
    said side panels each including an inner panel and an outer panel,
    said at least one hinged section including both the inner and outer panels.

2. The truck bed of claim 1, wherein said lock/latch mechanism is hidden from an external view of the bed.

3. The truck bed of claim 1, wherein further comprising an inner panel section removed in an area adjacent an outer panel section, and the outer panel section is hinged.

4. The truck bed of claim 1, wherein the hinged section is vertically hinged.

5. The truck bed of claim 1, additionally including at least one structural support which at least extends across and beneath said floor.

6. The truck bed of claim 5, wherein said structural support is composed of a plurality of collapsible support members.

7. The truck bed of claim 5, wherein said structural support comprises a plurality of U-shaped members having sections thereof located in said side panels.

8. The truck bed of claim 7, wherein said sections of said U-shaped members are located intermediate said inner and outer panels of said side panels.

9. The truck bed of claim 8, wherein each of said side panels is provided with a plurality of said hinged sections.

10. The truck bed of claim 9, wherein at least one of said plurality of hinged sections is hinged vertically.

11. The truck bed of claim 1, additionally including a storage system located in said bed, intermediate said inner panels, and adjacent at least said hinged section of at least said one side panel, said storage system including a box having an opening therein located at least adjacent said hinged section.

12. The truck bed of claim 11, wherein said box is provided with at least one drain/air valve assembly in a bottom section thereof.

13. The truck bed of claim 11, wherein said box is provided with shelving therein selected from the group of fixed shelves, adjustable shelves, slideable shelves, and pivotable shelves.

14. The truck bed of claim 11, wherein said box is provided with at least one shelf and at least one compartment.

15. The truck bed of claim 11, wherein said box is provided with a movable and collapsible support means for a shelf, tray, or compartment.

16. The truck bed of claim 1, additionally including a collapsible beam support assembly located beneath said bed.

* * * * *